(12) United States Patent
Shiire et al.

(10) Patent No.: US 8,574,439 B2
(45) Date of Patent: Nov. 5, 2013

(54) VALUABLE RESOURCE RECOVERY SYSTEM AND OPERATION METHOD THEREOF

(75) Inventors: Hidetake Shiire, Tokyo (JP); Nobuyuki Ashikaga, Kawasaki (JP); Shinobu Moniwa, Kawasaki (JP); Tomoaki Kiuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 12/871,007

(22) Filed: Aug. 30, 2010

(65) Prior Publication Data

US 2011/0056885 A1 Mar. 10, 2011

(30) Foreign Application Priority Data

Sep. 7, 2009 (JP) ................ P2009-206269

(51) Int. Cl.
*C02F 1/28* (2006.01)
(52) U.S. Cl.
USPC ........... 210/662; 210/202; 210/223; 210/259; 210/269; 210/411; 210/502.1; 210/512.1; 210/671; 210/675; 210/693; 210/695; 210/741; 210/791
(58) Field of Classification Search
USPC ........... 210/202, 223, 259, 269, 502.1, 512.1, 210/671, 675, 693, 695, 411, 662, 741, 791
See application file for complete search history.

(56) References Cited

U.S. PATENT DOCUMENTS

| | | | | |
|---|---|---|---|---|
| 3,767,571 A | * | 10/1973 | Lorenc et al. | 210/671 |
| 3,783,129 A | * | 1/1974 | Bunn | 210/671 |
| 3,798,158 A | * | 3/1974 | Bunn | 210/671 |
| 3,890,224 A | * | 6/1975 | Weiss et al. | 210/671 |
| 5,244,580 A | * | 9/1993 | Li | 210/666 |
| 8,142,650 B2 | * | 3/2012 | Moniwa et al. | 210/96.1 |
| 2009/0314717 A1 | | 12/2009 | Fujieda et al. | |

(Continued)

FOREIGN PATENT DOCUMENTS

| JP | 53-26454 | 3/1978 |
|---|---|---|
| JP | 2002-167626 | 6/2002 |

(Continued)

OTHER PUBLICATIONS

First Office Action issued by the State Intellectual Property Office of the People's Republic of China on Mar. 31, 2012, for Chinese Application No. 201010265914.2, and English-language translation thereof.

(Continued)

*Primary Examiner* — Matthew O Savage
(74) *Attorney, Agent, or Firm* — Finnegan, Henderson, Farabow, Garrett & Dunner, L.L.P.

(57) ABSTRACT

A valuable resource recovery system includes an engineered powder supply unit that supplies an engineered powder into drainage water (the engineered powder can adsorb a valuable resource and can be desorbed from the engineered powder), an agitation unit that agitates the drainage water supplied with the engineered powder, an engineered powder separation unit that separates the engineered powder from the drainage water agitated by the agitation unit, an engineered powder collection unit that collects the engineered powder separated by the engineered powder separation unit, and a desorption-recycle unit that desorbs the valuable resource from the engineered powder collected by the engineered powder collection unit to recycle the engineered powder and the valuable resource. According to the system, the valuable resource can be desorbed from the engineered powder and then recycled.

11 Claims, 15 Drawing Sheets

(56) References Cited

U.S. PATENT DOCUMENTS

| | | |
|---|---|---|
| 2010/0059444 A1 | 3/2010 | Moniwa et al. |
| 2010/0059448 A1 | 3/2010 | Fujieda et al. |
| 2010/0230358 A1 | 9/2010 | Fukaya et al. |

FOREIGN PATENT DOCUMENTS

| | | |
|---|---|---|
| JP | 2003-340442 | 12/2003 |
| JP | 2004-181342 | 7/2004 |
| JP | 2004-337748 | 12/2004 |
| JP | 2005-46728 | 2/2005 |
| JP | 2005-177532 | 7/2005 |
| JP | 2009-56457 | 3/2009 |
| JP | 2009-136784 | 6/2009 |
| WO | WO 2010/047088 A1 | 4/2010 |

OTHER PUBLICATIONS

Notification of Reasons for Refusal issued by the Japanese Patent Office on Sep. 6, 2011, and English-language translation thereof.

Notification of Reasons for Refusal issued by the Japanese Patent Office on Aug. 14, 2012, for Japanese Patent Application No. 2009-206269, and English-language translation thereof.

* cited by examiner

FIG. 7
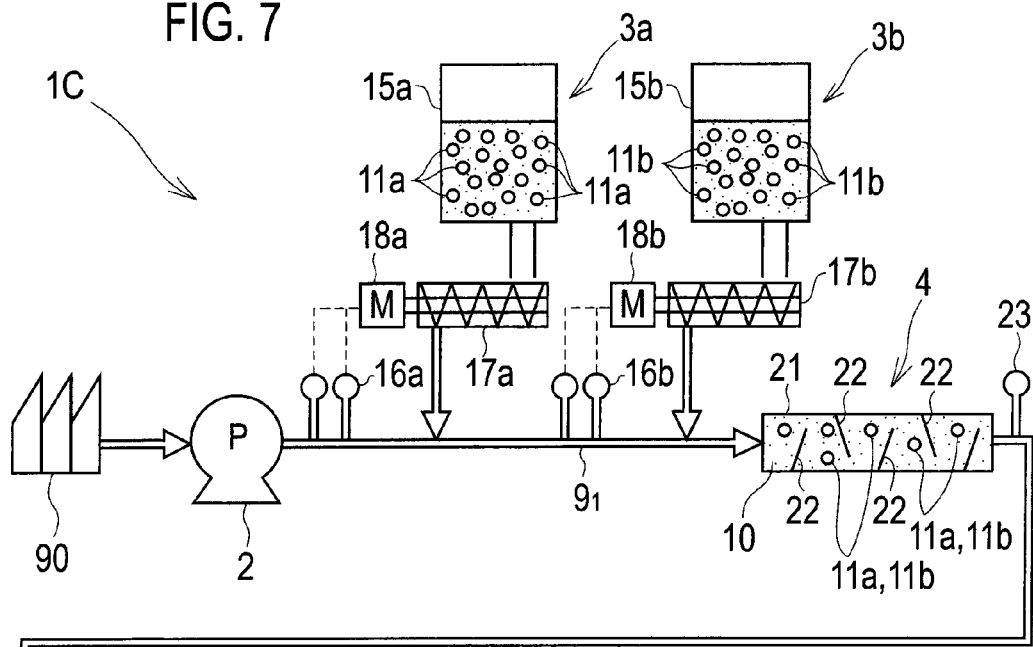
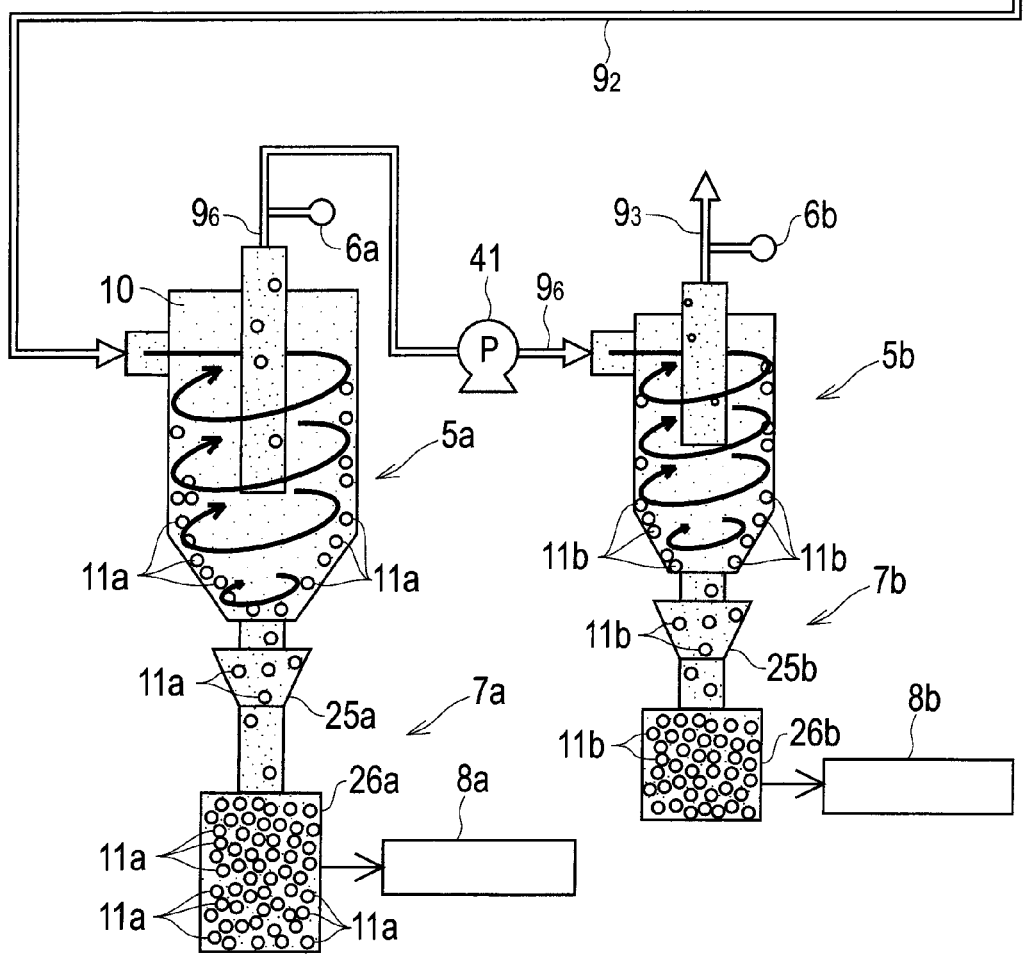

VALUABLE RESOURCE RECOVERY SYSTEM AND OPERATION METHOD THEREOF

BACKGROUND OF INVENTION

1. Field of Invention

The present invention relates to a valuable resource recovery system for recover valuable resources such as oil in drainage water, and an operation method thereof.

2. Description of Related Art

Recently, desired is a technique for recovery and recycle of valuable resources such as oil, fluorine, boron, rare metals, heavy metals or the like that are contained in various drainage water such as industrial drainage water, public drainage water and so on.

In a Japanese Patent Application Laid-Open No. 2005-177532. disclosed is a turbid treatment apparatus that removes oil from drainage water including oil. In the turbid treatment apparatus, magnetic particles and flocculants are firstly added to drainage water, and then they are agitated and mixed. By this process, the oil and the magnetic particles are flocculated due to the flocculants and form flocks. In the turbid treatment apparatus, the oil is removed by collecting the flocks with the use of magnet.

SUMMARY OF INVENTION

However, the oil removed from the drainage water can't be desorbed form the magnetic particles in the turbid treatment apparatus. Therefore, it is hard to recycle the removed oil as valuable resource.

An object of the present invention is to provide a valuable resource recovery system that can desorb valuable resources from engineered powders for recycling the valuable resources, and an operation method thereof.

A first aspect of the present invention provides a valuable resource recovery system that includes a first engineered powder supply unit that supplies a first engineered powder into drainage water (the first engineered powder is capable of adsorbing a first valuable resource and the first valuable resource is capable of being desorbed from the first engineered powder), an agitation unit that agitates the drainage water supplied with the first engineered powder, a first engineered powder separation unit that separates the first engineered powder from the drainage water agitated by the agitation unit, a first engineered powder collection unit that collects the first engineered powder separated by the first engineered powder separation unit, and a desorption-recycle unit that desorbs the first valuable resource from the first engineered powder collected by the first engineered powder collection unit to recycle the first engineered powder and the first valuable resource.

It is preferable that the first engineered powder supply unit is provided as a quantitative supply unit, and the quantitative supply unit supplies the first engineered powder collected by the first engineered powder collection unit to an upstream of the agitation unit.

It is preferable that the first engineered powder includes a carrier, and a coated resin that is coated around the carrier and capable of causing the first valuable resources desorbed from the carrier.

It is preferable that the system further includes a precise capture device that is provided on a drainage side of treated water downstream of the first engineered powder separation unit and captures the first engineered powder that has not been separated from the drainage water and remains in the treated water. Note that the drainage water has been separated into the first engineered powder and the treated water by the first engineered powder separation unit.

Here, it is preferable that the system further includes a backwashing collection unit that backwashes the precise capture device to collect the first engineered powder captured by the precise capture device.

It is preferable that the system further includes a second engineered powder supply unit that supplies a second engineered powder into the drainage water. Here, the second engineered powder is capable of adsorbing a second valuable resource, and the second valuable resource is different from the first valuable resource and capable of being desorbed from the second engineered powder.

Here, it is preferable that the system further includes a second engineered powder separation unit that separates the second engineered powder from the drainage water agitated by the agitation unit, and a second engineered powder collection unit that collects the second engineered powder separated by the second engineered powder separation unit.

It is preferable that the system further includes a return pipe that connects the first engineered powder collection unit with an upstream of the first engineered powder separation unit, and an adjustment unit that is provided in a middle of the return pipe and adjusts a flow rate of the drainage water through the return pipe.

It is preferable that the system further includes a third engineered powder separation unit that separates the first engineered powder from the drainage water agitated by the agitation unit, and a third engineered powder collection unit that collects the first engineered powder separated by the third engineered powder separation unit.

A second aspect of the present invention provides an operation method of a valuable resource recovery system. The system is configured according to the above first aspect of the present invention and further includes a first measuring instrument that is disposed upstream from a supply point of the first engineered powder by the first engineered powder supply unit and measures concentration of the first valuable resource in the drainage water. The operation method includes: controlling a supply amount of the first engineered powder to be supplied by the first engineered powder supply unit based on the concentration of the first valuable resource measured by the first measuring instrument and adsorption capability of the first engineered powder.

It is preferable that the system further includes a second measuring instrument that is disposed downstream from an agitation point by the agitation unit and measures concentration of the first valuable resource in the drainage water, and the operation method further includes: controlling the supply amount of the first engineered powder to be supplied by the first engineered powder supply unit based on the concentration of the first valuable resource measured by the second measuring instrument.

It is preferable that the first engineered powder supply unit is provided as a quantitative supply unit, and the quantitative supply unit supplies the first engineered powder collected by the first engineered powder collection unit to an upstream of the agitation unit. In addition, the system further includes a third measuring instrument that is disposed downstream from an agitation point by the agitation unit and measures concentration of the first valuable resource in the drainage water. Here, the operation method further includes: recirculating, by the quantitative supply unit, the first engineered powder repeatedly until the concentration of the first valuable source measured by the third measuring instrument excesses over a criterion value.

It is preferable that the system further includes a fourth measuring instrument that is disposed on a drainage side of treated water downstream from the first engineered powder separation unit and measures concentration of the first valuable resource in the treated water. Note that the drainage water having been separated into the first engineered powder and the treated water by the first engineered powder separation unit. Here, the operation method further includes: replacing the first engineered powder when a measurement result of the fourth measuring instrument excesses over another criterion value.

It is preferable that the system further includes a precise capture device that is provided on a drainage side of treated water downstream of the first engineered powder separation unit and captures the first engineered powder that has not been separated from the drainage water and remains in the treated water, and a backwashing collection unit that backwashes the precise capture device to collect the first engineered powder captured by the precise capture device. Note that the drainage water has been separated into the first engineered powder and the treated water by the first engineered powder separation unit. Here, the operation method further includes: collecting the first engineered powder captured by the precise capture device by carrying out a backwash process at intervals by the backwashing collection unit.

It is preferable that the system further includes a precise capture device that is provided on a drainage side of treated water downstream of the first engineered powder separation unit and captures the first engineered powder that has not been separated from the drainage water and remains in the treated water, a backwashing collection unit that backwashes the precise capture device to collect the first engineered powder captured by the precise capture device, and a pressure measuring instrument that measures a pressure loss due to the precise capture device. Note that the drainage water has been separated into the first engineered powder and the treated water by the first engineered powder separation unit. Here, the operation method further includes: carrying out a backwash process by the backwashing collection unit when the pressure loss measured by the pressure measuring instrument excesses over a criterion value.

It is preferable that the system further includes a precise capture device that is provided on a drainage side of treated water downstream of the first engineered powder separation unit and captures the first engineered powder that has not been separated from the drainage water and remains in the treated water, a backwashing collection unit that backwashes the precise capture device to collect the first engineered powder captured by the precise capture device, and a fifth measuring instrument that is disposed on the drainage side downstream from the precise capture device and measures concentration of the first engineered powder in the treated water. Note that the drainage water has been separated into the first engineered powder and the treated water by the first engineered powder separation unit. Here, the operation method further includes: collecting the first engineered powder captured by the precise capture device by carrying out a backwash process by the backwashing collection unit when the concentration of the first engineered powder measured by the fifth measuring instrument excesses over a criterion value.

It is preferable that the system further includes a third engineered powder separation unit that separates the first engineered powder from the drainage water agitated by the agitation unit, and a third engineered powder collection unit that collects the first engineered powder separated by the third engineered powder separation unit. Here, the operation method further includes: stopping delivery of the drainage water to one of the first and third engineered powder separation units; moving the first engineered powder collected by one of the first and third engineered powder collection units corresponding to the one of the first and third engineered powder separation units; and continuing a treatment process of the drainage water by another of the first and third engineered powder separation units.

According to the above aspects of the present invention, the first valuable resource can be desorbed from the first engineered powder and then recycled by the desorption-recycle unit after the first engineered powder has adsorbed the first valuable resource. Therefore, the first engineered powder and the first valuable resource can be recycled.

BRIEF DESCRIPTION OF DRAWINGS

FIG. 7 is an overall configuration diagram showing a fourth embodiment of a valuable resource recovery system according to the present invention;

DETAILED DESCRIPTION OF EMBODIMENT (First Embodiment)

Figure 1:
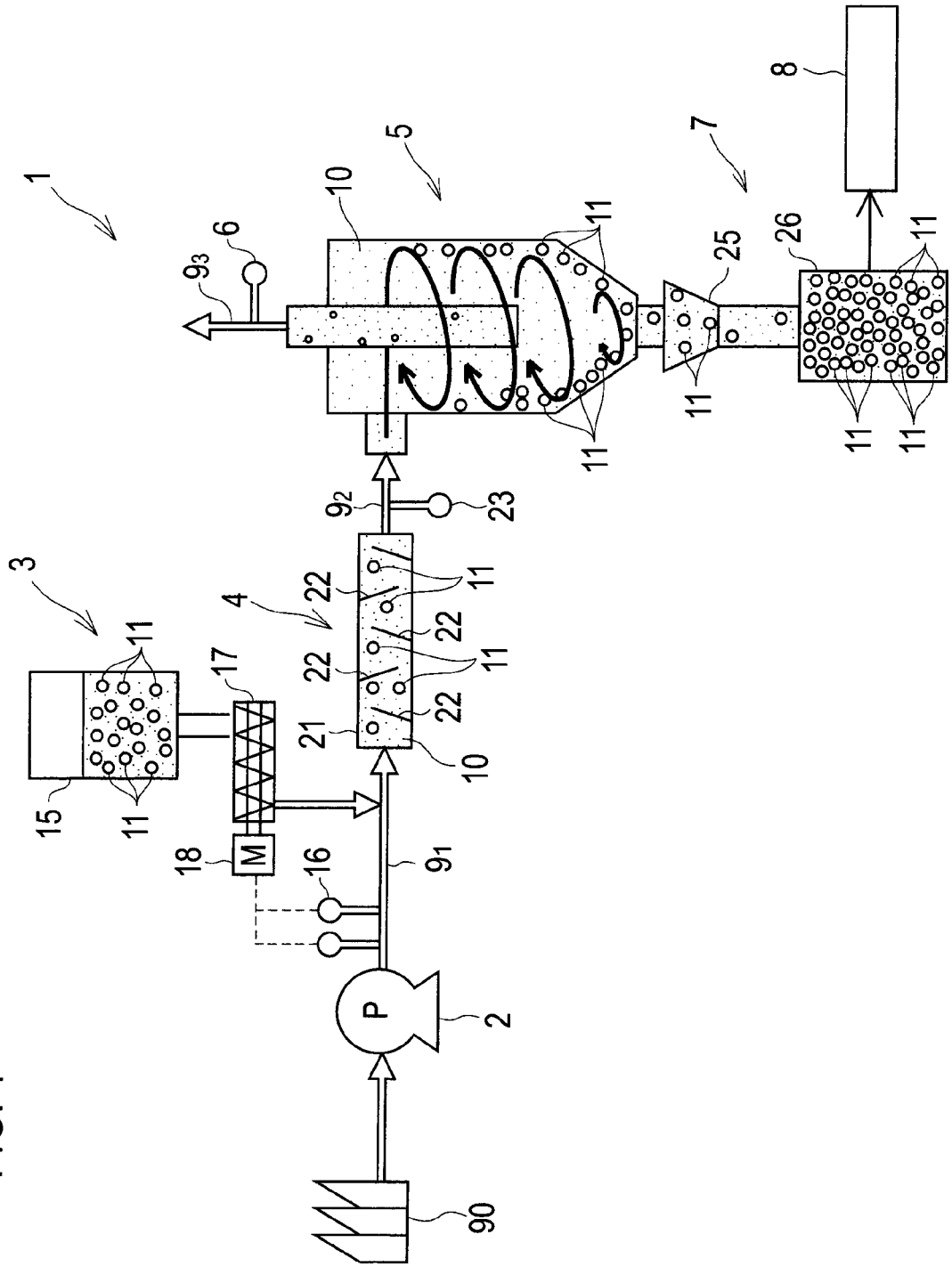
FIG. 1 is an overall configuration diagram showing a first embodiment of a valuable resource recovery system according to the present invention.

Hereinafter, a first embodiment of a valuable resource recovery system according to the present invention is explained with reference to the drawings. FIG. 1 shows an overall configuration diagram showing the first embodiment.

As shown in FIG. 1, a valuable resource recovery system 1 includes a drain pump 2, an engineered powder supply unit 3, an agitation unit 4, an engineered powder separation unit 5, a measuring instrument 6, an engineered powder collection unit 7, a desorption-recycle unit 8, and pipes $9_n$ (n=1, 2, . . . ) that connect the above units.

The drain pump 2 delivers drainage water 10 that has been drained from a plant 90 or the like to the agitation unit 4 through the pipe $9_1$.

The engineered powder supply unit 3 supplies engineered powder 11 into the drainage water 10. The engineered powder supply unit 3 is provided in the middle of the pipe $9_1$. That is, the engineered powder supply unit 3 is arranged between the drain pump 2 and the agitation unit 4.

Figure 2:
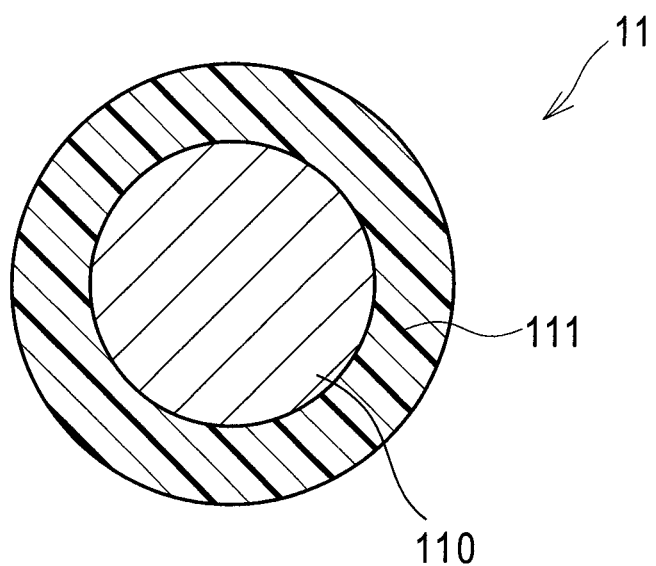
FIG. 2 is a cross-sectional view of an engineered powder used in embodiments according to the present invention.

The engineered powder 11 is composed so as to adsorb the oil as the valuable resource and the adsorbed oil can be desorbed from the engineered powder 11. As shown in FIG. 2, the engineered powder 11 includes a carrier 110 and coated resin 111 that is coated around the carrier 110. The carrier 110 is made of magnetic material $Fe_3O_4$. Note that the carrier 110 may be an inorganic particle, a metal particle and so on. The coated resin 111 is composed so as so to adsorb the valuable resource. The adsorbed valuable resource can be separated (desorbed) from the carrier 110. In other words, it can be said that the first engineered powder 11 can desorb the first valuable resource (oil). The desorption of the first valuable resource will be explained in detail later. The coated resin 111 is made of shellac resin containing hydroxyfatty acid and sesquiterpene acid. Note that it is preferable that the coated resin 111 has both a hydrophobic part and a hydrophilic part.

The engineered powder supply unit 3 includes a supply cartridge 15, measuring instruments 16, a feeder 17 and a drive motor 18. The supply cartridge 15 is a reservoir of the engineered powder 11 to be supplied. The measuring instruments are disposed upstream from an injection point of the engineered powder 11 by the feeder 17 to measure concentration of the valuable resource contained in the drainage water 10. The feeder 17 is rotated by the drive motor 18 to supply the engineered powder 11 from the supply cartridge 15 into the pipe $9_1$. The drive motor 18 is controlled based on the concentration of the valuable resource measured by the measuring instruments 16 and adsorption capability of the engineered powder 11. Here, the concentration of the valuable resource is measured by the measuring instruments 16. The adsorption capability of the engineered powder 11 is a sorbable amount of the valuable resource to be adsorbed by the engineered powder 11. In this manner, supplied amount of the engineered powder 11 is controlled.

The agitation unit 4 agitates the drainage water 10 into which the engineered powder 11 has been supplied. The agitation unit 4 includes a casing 21, agitation plates 22 and a measuring instrument 23. The drainage water 10 into which the engineered powder 11 has been supplied is supplied into the casing 21 by the drain pump 2. Each of the agitation plates 22 is projected from an inner wall of the casing 21 in an inclined state. The agitation plates 22 are arranged with predetermined intervals therebetween. The agitation unit 4 agitates the drainage water 10 by changing a flow of the drainage water 10 supplied into the casing 21 by the agitation plates 22. In this manner, improved is contact efficiency between the valuable resource contained in the drainage water 10 and the supplied engineered powder 11. As a result, adsorption efficiency of the valuable resource by the engineered powder 11 is improved. The measuring instrument 23 measures the concentration of the valuable resource contained in the drainage water 10 (step S140 in FIG. 3). The measuring instrument 23 is provided downstream from the casing 21 as an agitation point of the drainage water 10. The measuring instrument 23 feeds its measurement result back to the engineered powder supply unit 3. The engineered powder supply unit 3 adjusts the supplied amount of the engineered powder 11 based on the measurement result.

The engineered powder separation unit 5 separates the engineered powder 11 from the drainage water 10 that has been agitated by the agitation unit 4. The engineered powder separation unit 5 includes a cyclone separator that separates solids from liquids with the use of a centrifugal force. Since the engineered powder 11 adsorbing the valuable resource is solid, the engineered powder 11 settles downward. The drainage water (treated water) from which the engineered powder 11 has been separated is delivered upward through the pipe $9_3$.

The measuring instrument 6 measures a remaining amount of the valuable resource in the treated water. The measuring instrument 6 feeds its measurement result back to the engineered powder supply unit 3. The engineered powder supply unit 3 adjusts the supplied amount of the engineered powder 11 based on the measurement result.

The engineered powder collection unit 7 collects the engineered powder 11 settled down after separated by the engineered powder separation unit 5. The engineered powder collection unit 7 includes a pod 25 and a collection cartridge 26. The pod 25 connects the engineered powder separation unit 5 with the collection cartridge 26. One end of the pod 25 is located at a lower end of the engineered powder separation unit 5. The collection cartridge 26 is detachably attached to another end of the pod 25. The engineered powder 11 that has adsorbed the valuable resource is stored up in the collection cartridge 26.

The desorption-recycle unit 8 desorbs the valuable resource from the engineered powder 11 stored in the collection cartridge 26, and then recycles the engineered powder 11 and the valuable resource. In the desorption-recycle unit 8, the engineered powder 11 is cleaned with hexane and then the engineered powder 11 and the valuable resource are collected separately. Then, the desorption-recycle unit 8 recycles the engineered powder 11. The oil as the valuable resource is recycled for combustion and so on.

(Operation Method of Valuable Resource Recovery System)

Figure 3:
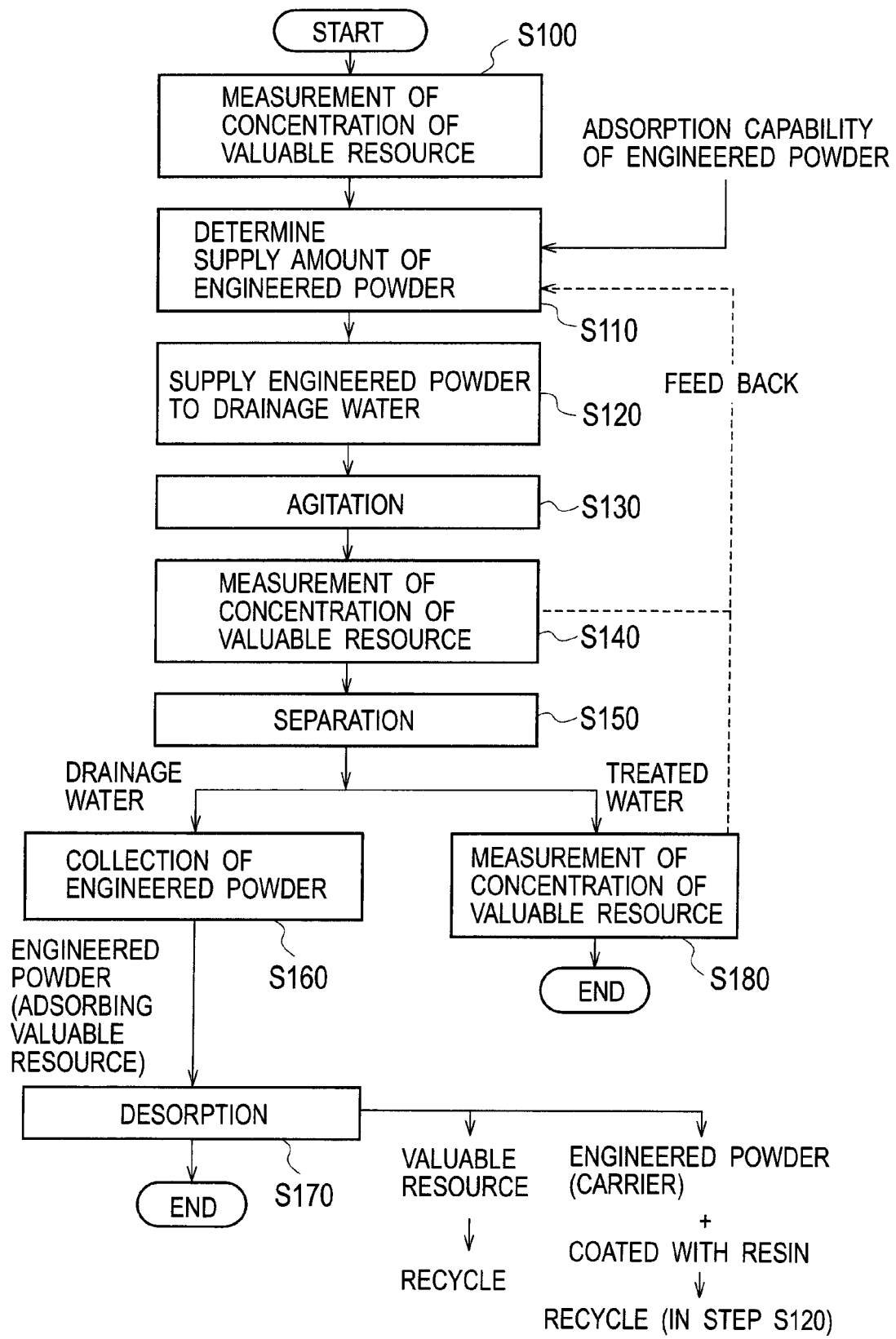
FIG. 3 shows a flow chart of operations in the first embodiment.

Next, an operation method of the valuable resource recovery system is explained with reference to the overall configuration diagram shown in FIG. 1 and a flow chart shown in FIG. 3.

First, the drainage water 10 that has been drained from the plant 90 or the like is delivered to the agitation unit 4 through the pipe $9_1$ by the drain pump 2. The concentration of the valuable resource in the delivered drainage water 10 is measured by the measuring instruments 16 (step S100). The engineered powder supply unit 3 determines the supplied amount of the engineered powder 11 to be supplied to the drainage water 10 based on the measurement result of the measuring instruments 16 (step S110). Then, the drive motor 18 is controlled to drive the feeder 17 according to the determined supplied amount. As a result, the desired amount of the engineered powder 11 is supplied to the drainage water 10 (step S120).

The drainage water 10 into which the engineered powder has been supplied is delivered to the agitation unit 4. The flow of the drainage water 10 is changed by the agitation plates 22 in the agitation unit 4, so that the drainage water 10 is strongly agitated (step S130). Therefore, improved is the contact efficiency between the supplied engineered powder 11 and the valuable resource, and then the adsorption efficiency of the valuable resource by the engineered powder 11 is improved.

After this, the drainage water 10 is delivered through the pipe $9_2$. The measuring instrument 23 measures the concentration of the valuable resource contained in the drainage water 10 flowing through the pipe $9_2$, and then feeds its measurement result back to the engineered powder supply unit 3. The engineered powder supply unit 3 adjusts the supplied amount of the engineered powder 11 based on the measurement result.

Subsequently, the drainage water 10 is delivered to the engineered powder separation unit 5 through the pipe $9_2$. In the engineered powder separation unit 5, the drainage water 10 containing the engineered powder 11 is swirled to apply a centrifugal force to the drainage water 10. As a result, the drainage water 10 is separated to solids and liquids, specifically, to the engineered powder 11 adsorbing the valuable resource and the treated water from which the valuable resource (step S150).

The separated treated water is delivered upward. The remaining amount of the valuable resources in the treated water is measured by the measuring instrument 6 (step S180). The measuring instrument 6 feeds its measurement result back to the engineered powder supply unit 3. The engineered powder supply unit 3 adjusts the supplied amount of the engineered powder 11 based on the measurement result.

On the other hand, the separated engineered powder 11 settles downward. The engineered powder 11 is stored in the collection cartridge 26 via the pod 25 (step S160). After this, the collection cartridge 26 is detached and then moved to the desorption-recycle unit 8 (step S170).

Subsequently, the collected engineered powder 11 is cleaned with hexane in the desorption-recycle unit 8. By this process, the oil as the valuable resource is desorbed from the engineered powder 11. After this, solution containing the engineered powder 11, the hexane and the valuable resource is heated in the desorption-recycle unit 8. In this process, the hexane in the solution evaporates first. Next, moisture in the solution evaporates. Lastly, the oil as the valuable resource evaporates. The oil is collected to be recycled for combustion. In addition, the carrier of the engineered powder 11 remains after entire of the solution evaporates. The desorption-recycle unit 8 collects the carrier of the engineered powder 11. After this, the desorption-recycle unit 8 coats the coated resin around the carrier to regenerate the engineered powder 11. Further, the regenerated engineered powder 11 is refilled in the supply cartridge 15 to be recycled.

(Advantages of Valuable Resource Recovery System)

Next, explained are advantages of the valuable resource recovery system according to the above described first embodiment.

As described above, the valuable resource is recovered using the engineered powder 11 that can adsorb and desorb the valuable resource in the valuable resource recovery system 1. Therefore, the desorption-recycle unit 8 can desorb the oil as the valuable resource that has been adsorbed on the engineered powder 11, so that the oil can be recycled efficiently.

In addition, the valuable resource recovery system 1 can be applied to different drainage water 10 and various valuable resources. Since the valuable resource recovery system 1 can be easily applied to different circumstances and environments, the valuable resource recovery system 1 has superior economic efficiency.

In addition, in the agitation unit 4 of the valuable resource recovery system 1, the agitation is done by changing the flow of the drainage water 10 by the agitation plates 22. Therefore, the drainage water 10 and the engineered powder 11 contact with each other and then react. As a result, according to the valuable resource recovery system 1, the agitation unit 4 can be downsized as compared with an agitation unit having an actuator such as a motor. Further, even if a needed time for the contact and the reaction varies according to kinds of the drainage water 10 and the valuable resource, existence/absence of adsorption inhibitor, and variable performance of the engineered powder 11, the valuable resource recovery system 1 can be applied to different circumstances by increasing or decreasing the agitation unit 4.

In addition, the engineered powder separation unit 5 of the valuable resource recovery system 1 includes the cyclone separator that separates solids from liquids with the use of a centrifugal force. Due to this configuration, according to the valuable resource recovery system 1, the engineered powder separation unit 5 can be drastically downsized and have a large improvement in speed of separation of the engineered powder 11 as compared with separating methods with gravity sedimentation or with batch adsorption in which a constant amount of the drainage water 10 is stored in a reaction tank.

In addition, in the valuable resource recovery system 1, the concentration of the valuable resource contained in the drainage water 10 is measured by the measuring instruments 16, 23 and 6. The engineered powder supply unit 3 adjusts the supplied amount of the engineered powder 11 based on their measurement results and the adsorption capability of the engineered powder 11. Therefore, excessive consumption of the engineered powder 11 can be prevented. As a result, operation cost of the valuable resource recovery system 1 can be reduced.

(Second Embodiment)

Figure 4:
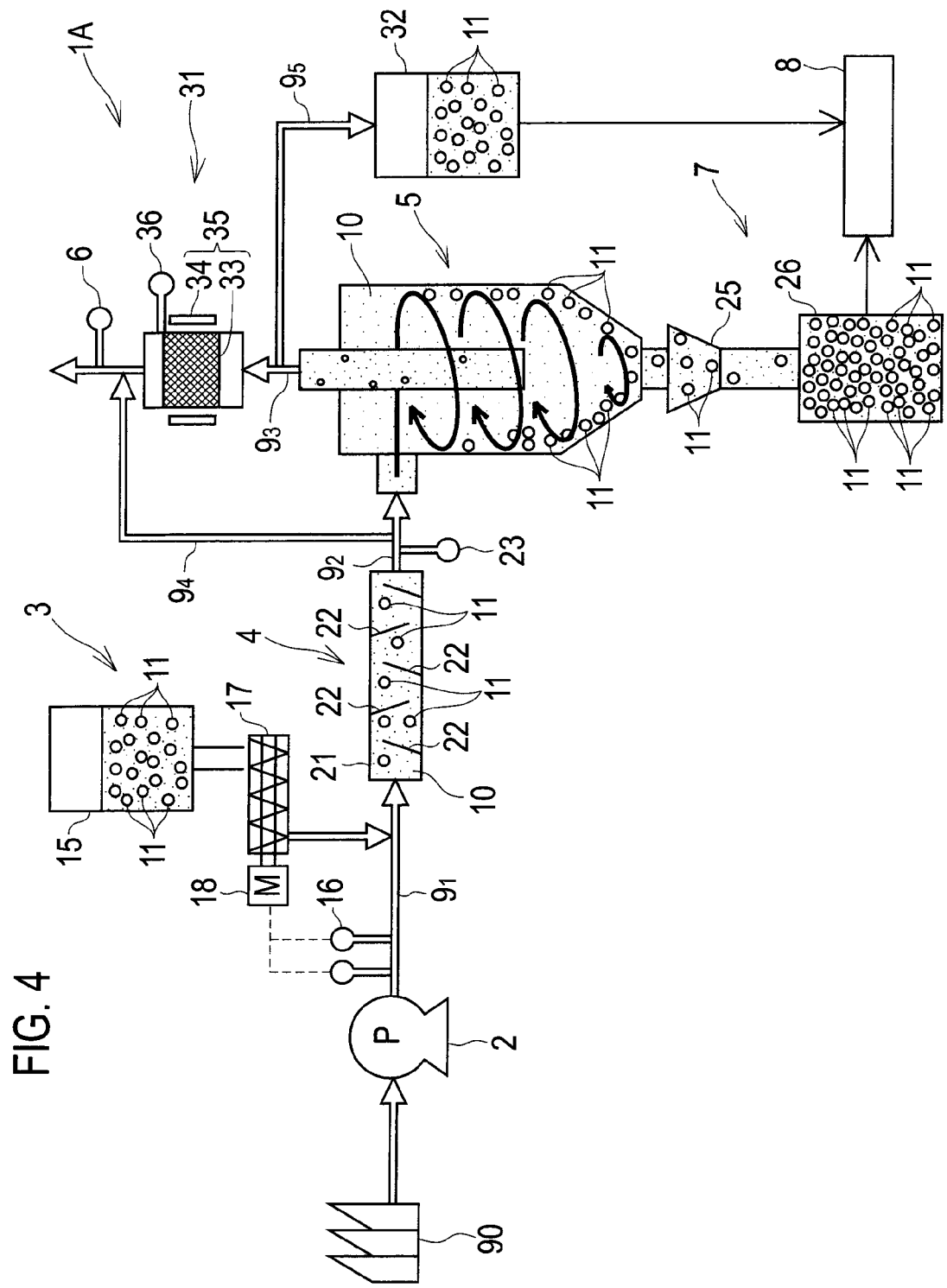
FIG. 4 is an overall configuration diagram showing a second embodiment of a valuable resource recovery system according to the present invention.
Figure 5:
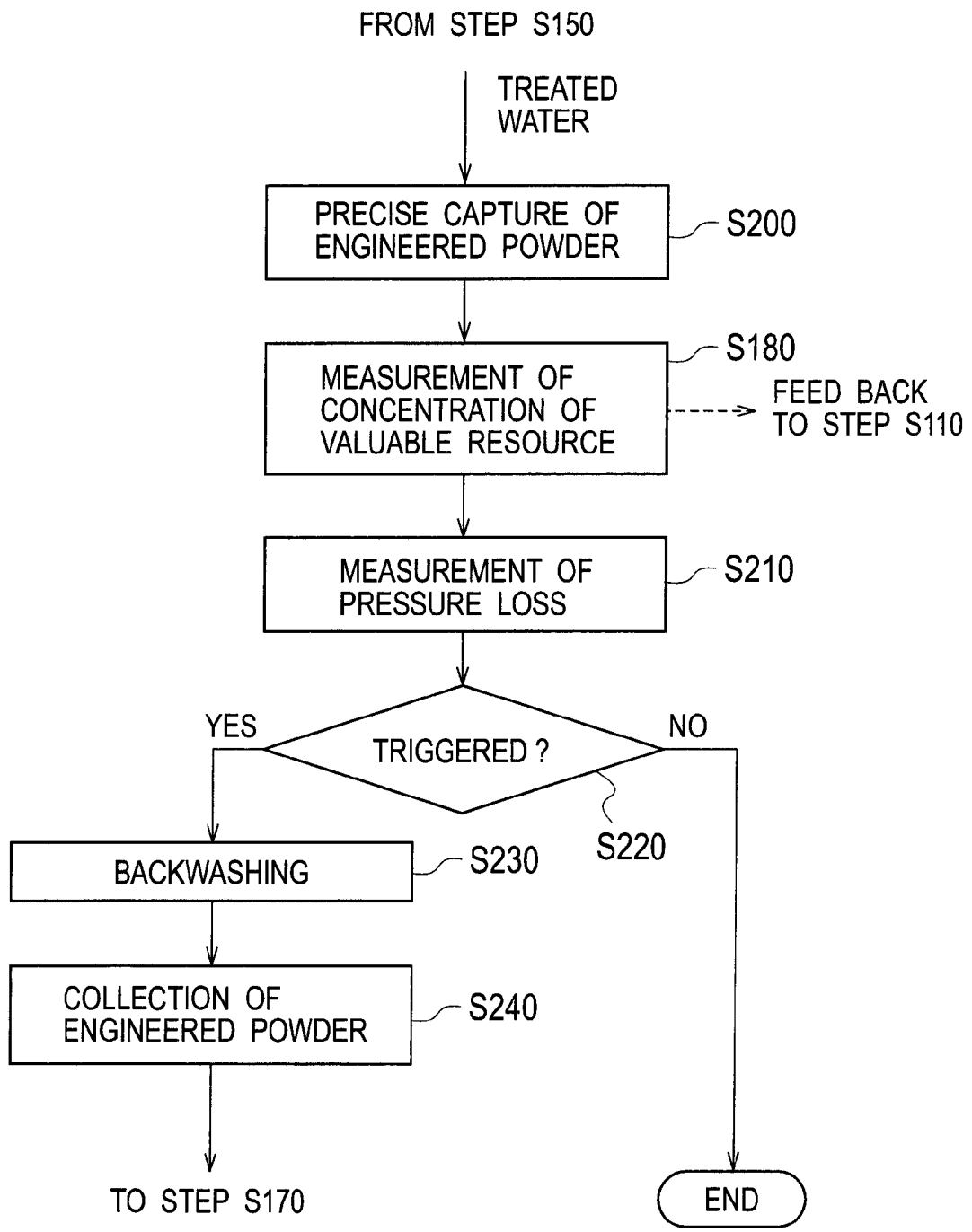
FIG. 5 shows a flow chart of operations in the second embodiment (showing only modified section from the flow chart of the first embodiment shown in FIG. 3)

Next, explained is a second embodiment that is partly modified from the above described first embodiment. FIG. 4 shows an overall configuration diagram showing the second embodiment. Note that configurations identical-to or equivalent-to those in the first embodiment are provided with the same numerals to abbreviate their redundant explanations. FIG. 5 shows a flow chart of operations of the present embodiment but it shows only a modified section from the flow chart shown in FIG. 3.

As shown in FIG. 4, a valuable resource recovery system 1A according to the second embodiment includes a precise capture device 31, a backwashing collection cartridge 32, and pipes $9_4$ and $9_5$ for a backwashing process in addition to the configuration in the first embodiment.

The precise capture device 31 captures the engineered powder 11 that has not been separated from the drainage water 10 and remains in the treated water (step S200). The precise capture device 31 is attached to the pipe $9_3$ for draining the drainage water 10. That is, the precise capture device 31 is arranged downstream from the engineered powder separation unit 5. The precise capture device 31 includes a magnetic separation membrane 35 having a metallic membrane 33 and an electromagnet 34, and a pressure measuring instrument 36. The metallic membrane 33 is disposed inside the pipe $9_3$ through which the treated water flows. The electromagnet 34 is disposed outside of the pipe $9_3$ through which the treated water flows. The pressure measuring instrument 36 measures a pressure loss due to the precise capture device 31 (step S210). When the pressure loss measured by the pressure measuring instrument 36 excesses over a criterion value (YES in step S220), it is judged that the precise capture device 31 reaches its capturing limit and then the backwashing process is carried out (step S240).

The backwashing collection cartridge 32 collects the engineered powder 11 captured by the precise capture device 31 through the backwashing process carried out at intervals. The backwashing collection cartridge 32 is arranged at a downstream side of the pipe $9_5$ that is branched from the pipe $9_3$ disposed between the engineered powder separation unit 5 and the precise capture device 31. The pipe $9_4$ connects the pipe $9_2$ with the pipe $9_3$ disposed downstream of the precise capture device 31.

In the valuable resource recovery system 1A according to the second embodiment, the electromagnet 34 of the precise capture device 31 is activated during a normal drainage treatment process. In addition, water delivery to the pipes $9_4$ and $9_5$ is stopped. In this state, the drainage water 10 flows form the agitation unit 4 to the engineered powder separation unit 5, and then the treated water separated by the engineered powder separation unit 5 is drained to the pipe $9_3$. By the precise capture device 31, captured is the engineered powder 11 that has not been separated as solids by the engineered powder separation unit 5 and remains in the treated water (e.g. the engineered powder 11 with a small particle size or a small density) (step S200). When a captured amount of the engineered powder 11 increases and it is detected through the pressure measuring instrument 36 (step S210) that the pressure loss due to the precise capture device 31 excesses over the criterion value (YES in step S220), the backwashing process is carried out (step S230).

The backwashing process is explained specifically. First, the flow of the drainage water 10 from the agitation unit 4 to the engineered powder separation unit 5 is closed off. Next, the electromagnet 34 of the precise capture device 31 is deactivated. After this, the drainage water 10 is delivered to the agitation unit 4, the pipe $9_4$, the precise capture device 31, the pipe $9_5$ and the backwashing collection cartridge 32. By this operation, the engineered powder 11 being captured in the precise capture device 31 is backwashed (step S230) and then collected in the backwashing collection cartridge 32 (step S240). After this, the engineered powder 11 collected in the backwashing collection cartridge 32 is desorbed and regenerated by the desorption-recycle unit 8. The regenerated engineered powder 11 is refilled in the supply cartridge 15 to be recycled.

As described above, the engineered powder 11 that has not been separated as solids by the engineered powder separation unit 5 is captured by the precise capture device 31 and then collected in the backwashing collection cartridge 32 in the valuable resource recovery system 1A according to the second embodiment. Therefore, collection rate of the engineered powder 11 can be increased and its recycle rate can be improved. As a result, operation cost of the valuable resource recovery system 1A can be reduced, and water quality conservation can be improved by reducing the concentration of the engineered powder 11 in the treated water.

In addition, since the backwashing process is done based on the measuring result of the pressure loss through the pressure measuring instrument 36 in the valuable resource recovery system 1A, its operational inhibitory due to an increase of the pressure loss can be prevented.

Note that, although the backwashing process is done based on the measuring result of the pressure loss through the pressure measuring instrument 36 in the above described second embodiment, the time when to carry out the backwashing process may be changed arbitrarily. For example, the backwash may be carried out at predetermined time intervals (the predetermined time interval is a trigger in step S220). Alternatively, the backwashing process may be carried out to collect the engineered powder 11 when the concentration of the engineered powder 11 measured by the measuring instrument 6 arranged downstream from the precise capture device 31 (in addition to the concentration of the valuable resource) excesses over a criterion value (the fact that concentration excesses over the criterion is a trigger in step S220).

(Third Embodiment)

Figure 6:
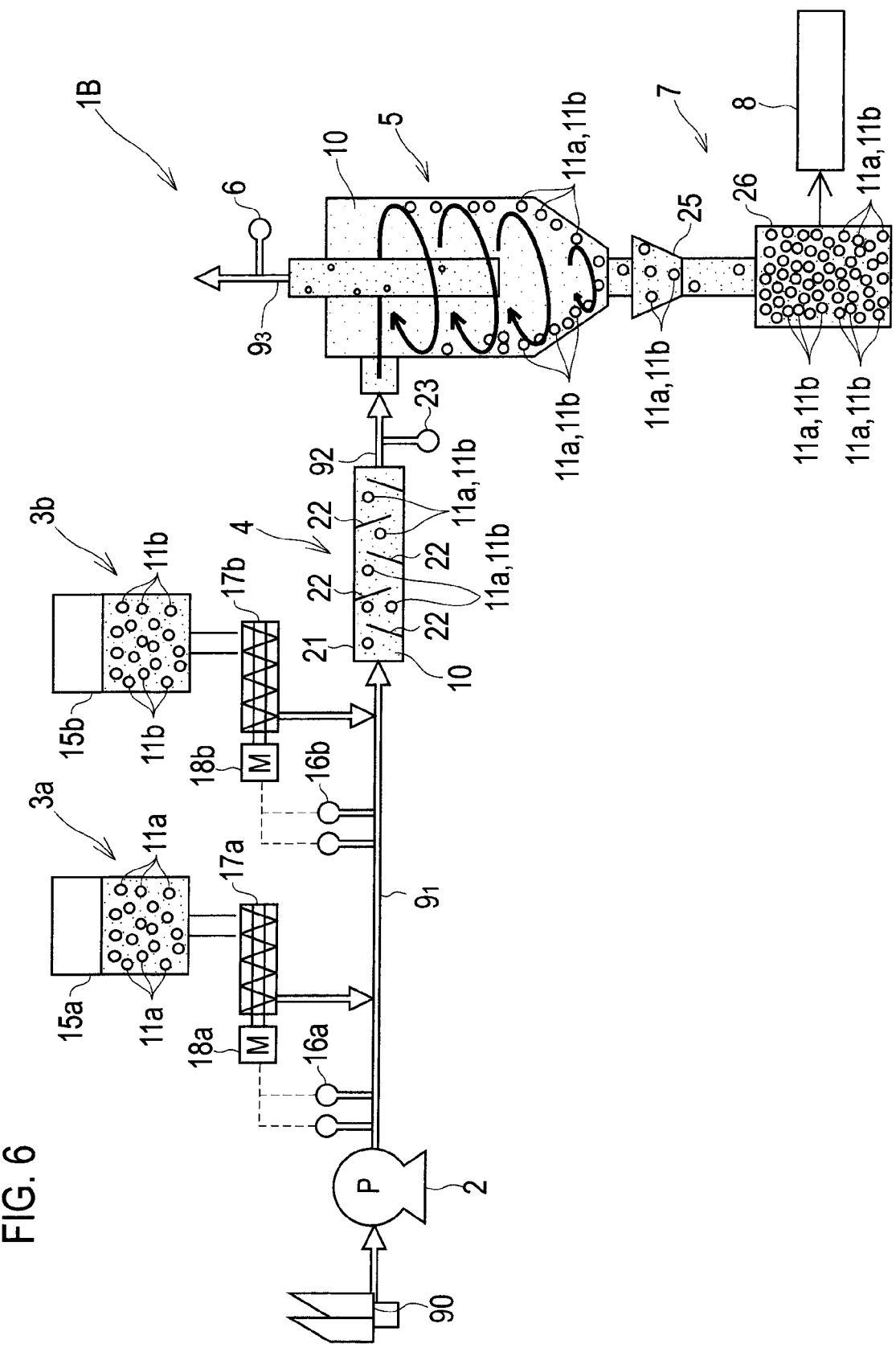
FIG. 6 is an overall configuration diagram showing a third embodiment of a valuable resource recovery system according to the present invention.

Next, explained is a third embodiment that is partly modified from the above described first embodiment. FIG. 6 shows an overall configuration diagram showing the third embodiment. Note that configurations identical-to or equivalent-to those in the first embodiment are provided with the same numerals to abbreviate their redundant explanations.

As shown in FIG. 6, a valuable resource recovery system 1B according to the third embodiment includes two of the engineered powder supply units 3a and 3b. Note that, elements 15a to 18a of the engineered powder supply unit 3a and elements 15b to 18b of the engineered powder supply unit 3b are identical to the elements 15 to 18 of the engineered powder supply unit 3 in the first embodiment, respectively. Therefore, their redundant explanations are abbreviated. Operations of the present embodiment are identically shown by the flow chart shown in FIG. 3.

Engineered powder that can adsorb and desorb oil is adopted as engineered powder 11a to be supplied from the engineered powder supply unit 3a. and engineered powder that can adsorb and desorb phosphorus (P) is adopted as engineered powder 11b to be supplied from the engineered powder supply unit 3b. The engineered powder 11b capable of adsorbing and desorbing phosphorus includes a carrier made of magnetic material such as iron, cobalt and nickel, and coated resin that is coated around the carrier. Nitrogen-containing compounds on which a zinc ion or a ferric ion is fixed and which has an amino group at an end of its molecular structure can be adopted as the coated resin. By this configuration of the valuable resource recovery system 1B according to the third embodiment, two of the valuable resources (oil and phosphorus) can be recycled. Both of the engineered powders 11a and 11b are sequentially supplied to the drainage water 10 by the engineered powder supply units 3a and 3b (step S120 in FIG. 3). And the supplied engineered powders 11a and 11b are concurrently separated by the engineered powder separation unit 5 (step S150 in FIG. 3) and then concurrently collected by the engineered powder collection unit 7 (step S160 in FIG. 3)

(Fourth Embodiment)

Figure 8:
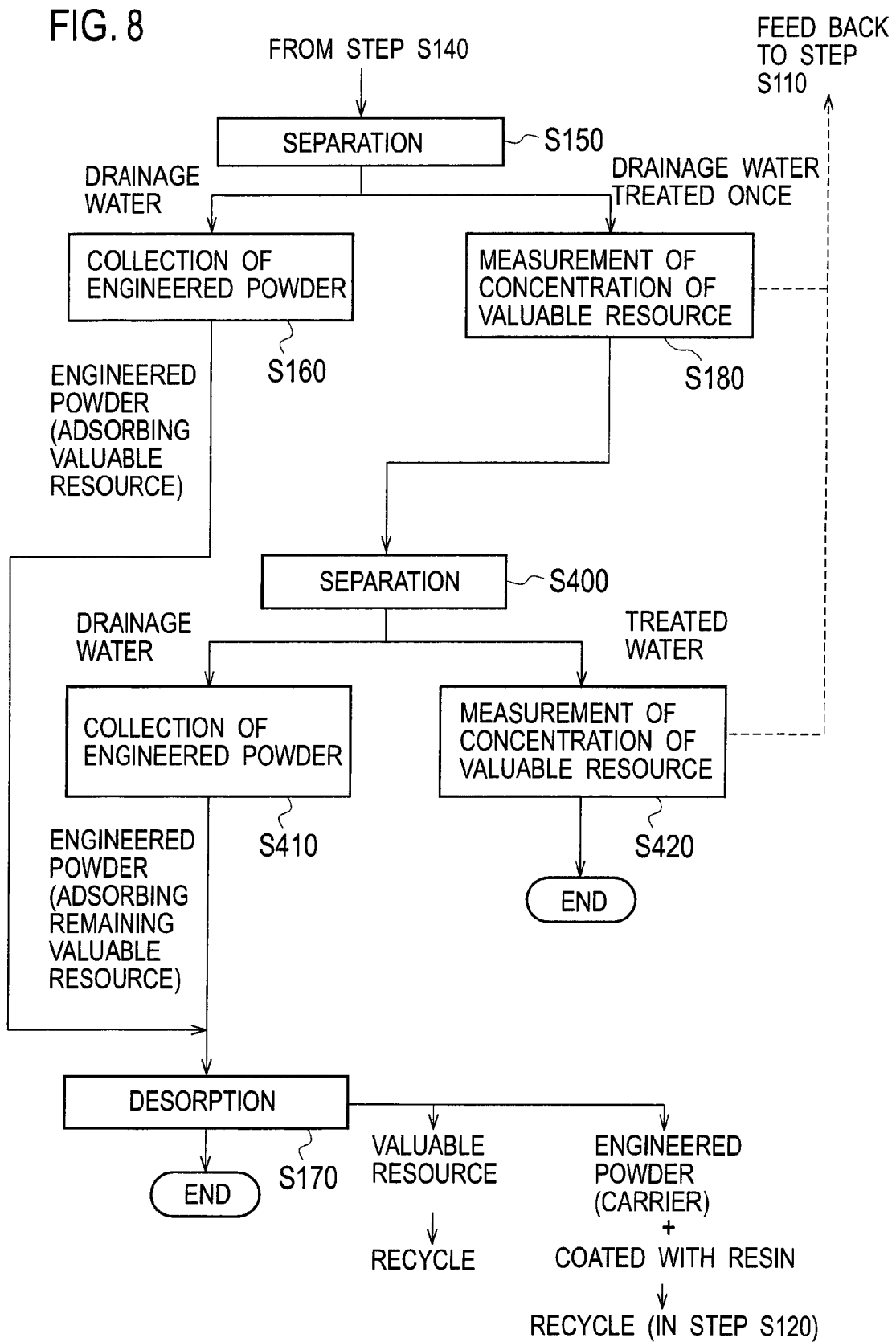
FIG. 8 shows a flow chart of operations in the fourth embodiment (showing only modified section from the flow chart shown of the first embodiment shown in FIG. 3)

Next, explained is a fourth embodiment that is partly modified from the above described third embodiment. FIG. 7 shows an overall configuration diagram showing the fourth embodiment. Note that configurations identical-to or equivalent-to those in the third embodiment are provided with the same numerals to abbreviate their redundant explanations. FIG. 8 shows a flow chart of operations of the present embodiment but it shows only a modified section from the flow chart shown in FIG. 3.

As shown in FIG. 7, a valuable resource recovery system 1C according to the fourth embodiment includes two of the engineered powder supply units 3a and 3b. similarly to the third embodiment, and further includes two of the engineered powder separation units 5a and 5b. two of the measuring instruments 6a and 6b. two of the engineered powder collection units 7a and 7b. and two of the desorption-recycle units 8a and 8b. In addition, the valuable resource recovery system 1C further includes the pipe $9_6$ connecting the engineered powder separation unit 5a with the engineered powder separation unit 5b. and an intermediate pump 41 provided in the middle of the pipe $9_6$.

A radius of the engineered powder separation unit 5a is made larger than that of the engineered powder separation unit 5b disposed downstream. In the valuable resource recovery system 1C, a particle size of the engineered powder 11a to be supplied by the engineered powder supply unit 3*a* for collecting oil is formed larger than that of the engineered powder 11*b* to be supplied by the engineered powder supply unit 3*b* for collecting phosphorus.

In the valuable resource recovery system 10 according to the fourth embodiment, the drainage water 10 that has flowed through the agitation unit 4 is delivered to the engineered powder separation unit 5*a*. Next, in the engineered powder separation unit 5*a*. the engineered powder 11*a* with the larger particle size is separated (step S150) and then collected in the collection cartridge 26*a* via the pod 25*a* of the engineered powder collection unit 7*a* (step S160). After this, oil is desorbed from the engineered powder 11*a* in the desorption-recycle unit 8*a* (step S170), and then the oil and the engineered powder 11*a* are recycled.

On the other hand, the engineered powder 11*b* with the smaller particle size that has not been separated by the engineered powder separation unit 5*a* is delivered to the pipe $9_6$ together with the drainage water 10 by the intermediate pump 41. After this, the engineered powder 11*b* is separated by the engineered powder separation unit 5*b* (step S400) and then collected in the collection cartridge 26*b* via the pod 25*b* of the engineered powder collection unit 7*b* (step S410). The collected engineered powder 11*b* is cleaned with basic desorption solution (e.g. NaOH solution) or neutral desorption solution (e.g. NaCl solution) in the desorption-recycle unit 8*b*. By this process, phosphorus as the valuable resource is desorbed from the engineered powder 11*b* (step S170). After this, the desorption solution, the phosphorus and the engineered powder 11*b* are collected separately by heating the engineered powder 11*b* and the desorption solution containing the phosphorus. The phosphorus is recycled. The engineered powder 11*b* is steeped through acid solution (HCl solution) to be revitalized.

As described above, the engineered powder separation units 5*a* and 5*b* with different radius are provided in the valuable resource recovery system 1C according to the fourth embodiment. Therefore, the engineered powders 11*a* and 11*b* can be collected separately in the engineered powder collection units 7*a* and 7*b*. As a result, engineered powders 11*a* and 11*b* can be easily recycled. In addition, the high-purity valuable resources (the ail and the phosphorus) can be collected and the valuable resources can be easily recycled.

Note that, the particle sizes of the engineered powders 11*a* and 11*b* are differentiated to be collected separately in the above described fourth embodiment, other elements of the engineered powders 11*a* and 11*b* (e.g. densities or the like) may be differentiated to be collected separately. In addition, a process in step S420 is the same as that in the above explained step S180.

(Fifth Embodiment)

Figure 9:
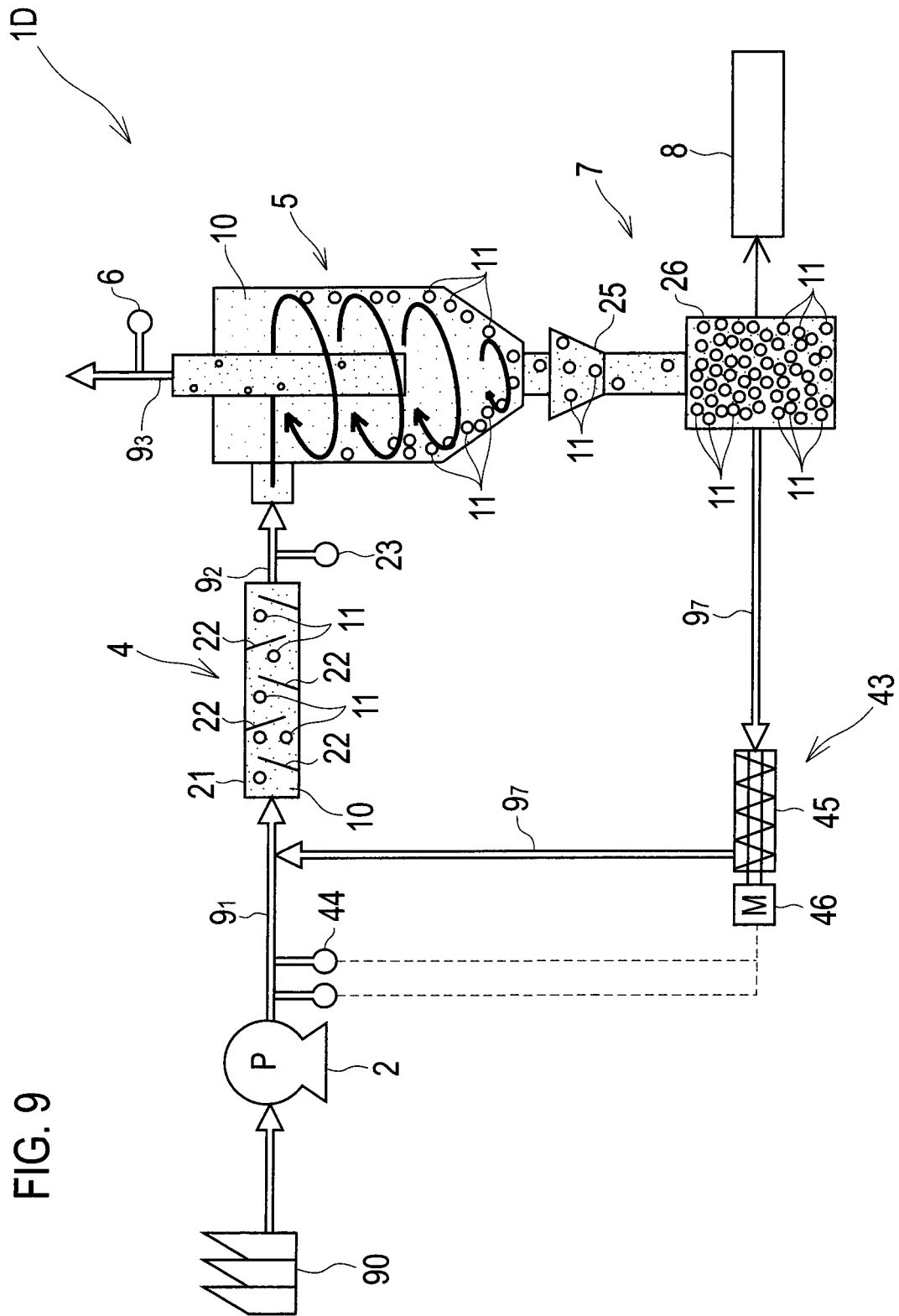
FIG. 9 is an overall configuration diagram showing a fifth embodiment of a valuable resource recovery system according to the present invention.
Figure 10:
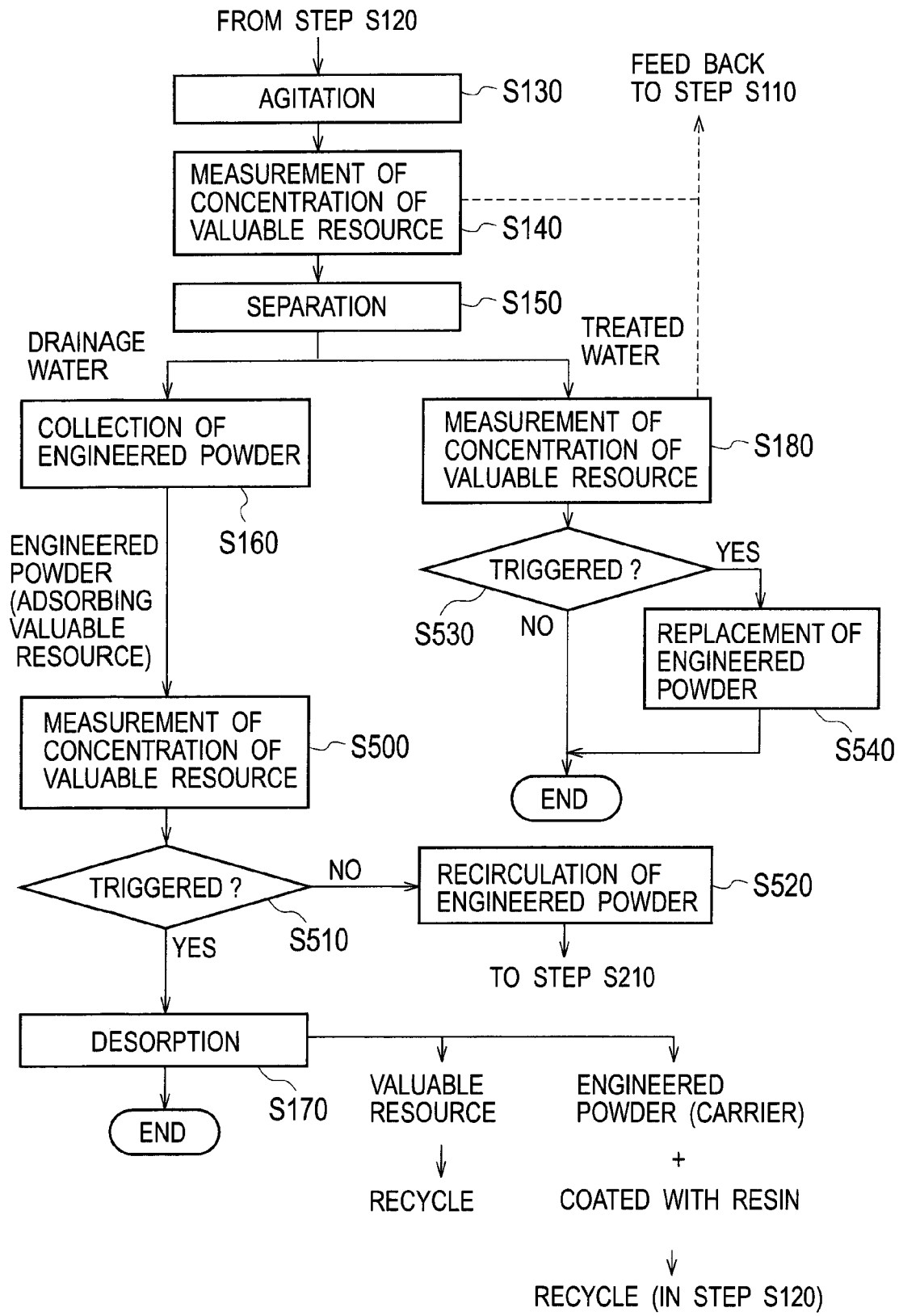
FIG. 10 shows a flow chart of operations in the fourth embodiment (showing only modified section from the flow chart shown of the fifth embodiment shown in FIG. 3)

Next, explained is a fifth embodiment that is partly modified from the above described first embodiment. FIG. 9 shows an overall configuration diagram showing the fifth embodiment. Note that configurations identical-to or equivalent-to those in the first embodiment are provided with the same numerals to abbreviate their redundant explanations. FIG. 10 shows a flow chart of operations of the present embodiment but it shows only a modified section from the flow chart shown in FIG. 3.

As shown in FIG. 9, a valuable resource recovery system 1D according to the fifth embodiment includes the drain pump 2, the agitation unit 4, the engineered powder separation unit 5, the measuring instrument 6, the engineered powder collection unit 7, the desorption-recycle unit 8, the pipes $9_n$ (n=1, 2, 3, 7) that connect the above units, and a quantitative supply unit 43. That is, the engineered powder supply unit 3 in the first embodiment is provided as the quantitative supply unit 43 in the present embodiment.

The pipe $9_7$ connects the collection cartridge 26 with the pipe $9_1$. The quantitative supply unit 43 supplies the engineered powder 11 that has been collected by the engineered powder collection unit 7 to the upstream of the agitation unit (step S520). The quantitative supply unit 43 includes measuring instruments 44, a feeder 45 and a drive motor 46. The measuring instruments 44 are provided in the middle of the pipe $9_1$. The feeder 45 and the drive motor 46 are provided in the middle of the pipe $9_7$. The measuring instruments 44, the feeder 45 and the drive motor 46 are identical to the measuring instruments 16, the feeder 17 and the drive motor 18 in the first embodiment, respectively.

In the valuable resource recovery system 1D according to the fifth embodiment, the drainage water 10 is treated while the engineered powder 11 is recirculated in the agitation unit 4, the engineered powder separation unit 5, the engineered powder collection unit 7, and the quantitative supply unit 43. The engineered powder 11 is repeatedly recirculated (step S520) until it is estimated, based on the concentration of the valuable source measured by the measuring instruments 6 and 23 (step S500), that the adsorption capability of the engineered powder 11 reduces and the engineered powder 11 goes into its adsorption breakthrough state (YES in step S510). When it is judged that the concentration of the valuable source measured by the measuring instrument 6 (step S180) excesses over a criterion value and the engineered powder 11 goes into the adsorption breakthrough state (YES in step S530), a drainage treatment process is stopped. The collection cartridge 26 that has collected the engineered powder 11 in the adsorption breakthrough state is replaced by a new one that is filled with the engineered powder 11 in a fresh state (step S540), and then the drainage treatment process is restarted. The valuable resource is desorbed from the collected engineered powder 11 in the replaced collection cartridge 26 in the desorption-recycle unit 8, and then the valuable resource and the engineered powder 11 are recycled. After this, the engineered powder 11 is refilled in the collection cartridge 26 to be recycled.

In the valuable resource recovery system 1D according to the fifth embodiment, the engineered powder 11 is recirculated. Therefore, the concentration of the engineered powder 11 in the drainage water 10 can be raised. In this manner, improved is the contact efficiency between the valuable resource and the engineered powder 11 contained in the drainage water 10. As a result, reactivity between the valuable resource and the engineered powder 11 is improved and then the agitation unit 4 can be downsized. Along with this, the valuable resource recovery system 1D can be also downsized.

In addition, in the valuable resource recovery system 1D, the engineered powder 11 can be recirculated until the engineered powder 11 goes into its adsorption breakthrough state based on the measurement results of the measuring instruments 6 and 23 and the adsorption capability of the engineered powder 11. Therefore, the most appropriate time for replacing the engineered powder 11 can be controlled. As a result, the engineered powder 11 can be utilized efficiently and operation cost of the valuable resource recovery system 1D can be reduced.

(Sixth Embodiment)

Figure 11:
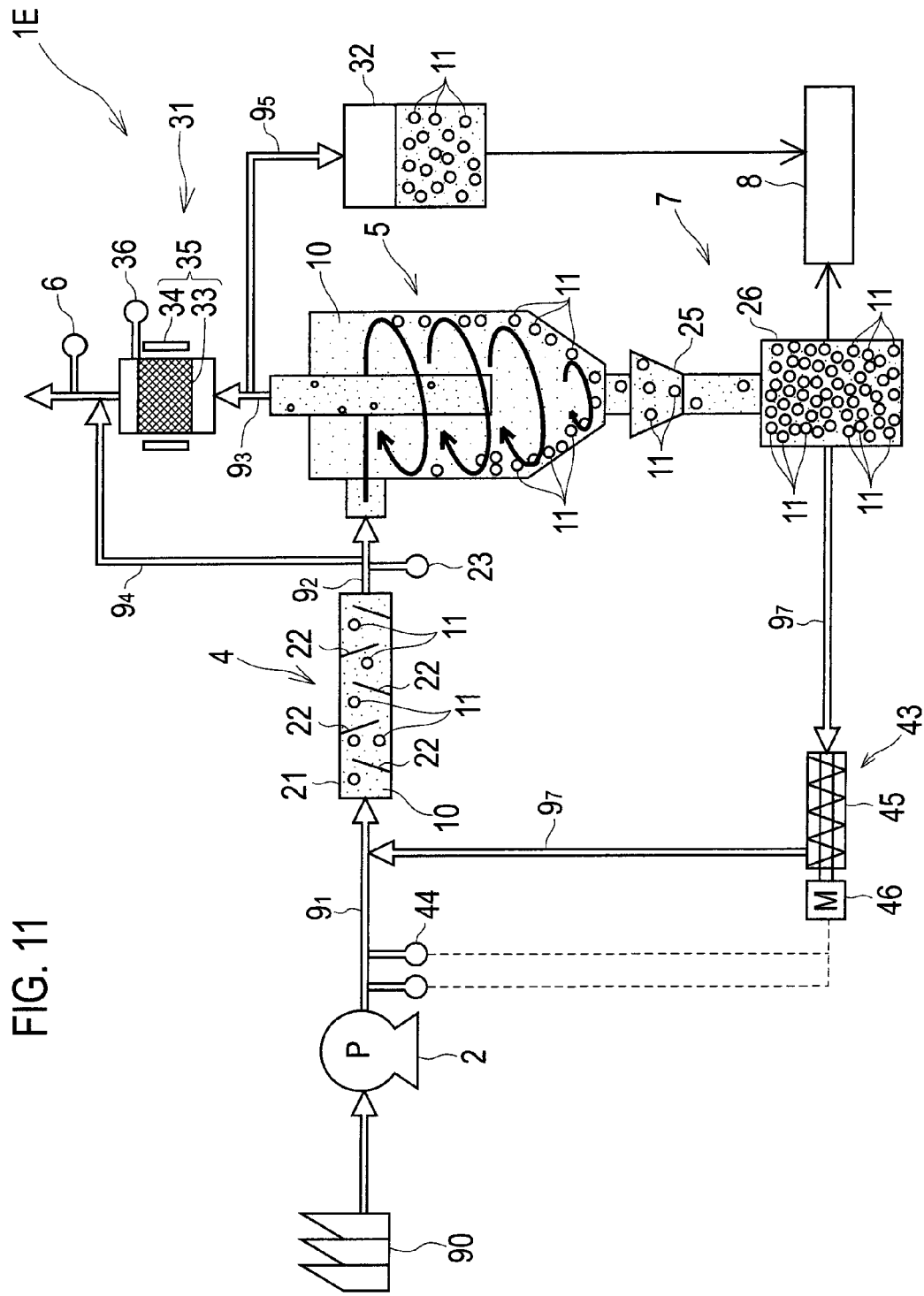
FIG. 11 is an overall configuration diagram showing a sixth embodiment of a valuable resource recovery system according to the present invention.

Next, explained is a sixth embodiment that combines the above described second and fifth embodiments. FIG. 11 shows an overall configuration diagram showing the sixth embodiment. Note that configurations identical-to or equivalent-to those in the second and fifth embodiments are provided with the same numerals to abbreviate their redundant explanations.

As shown in FIG. 11, a valuable resource recovery system 1E according to the sixth embodiment includes the configuration of the fifth embodiment, the precise capture device 31, the backwashing collection cartridge 32, and the pipes $9_4$ and $9_5$ for the backwashing process.

In the valuable resource recovery system 1E according to the sixth embodiment, the engineered powder 11 that has not been separated from the drainage water 10 due to the particle size or the density thereof and remains in the treated water drained through the pipe $9_3$ can be captured by the precise capture device 31.

(Seventh Embodiment)

Figure 12:
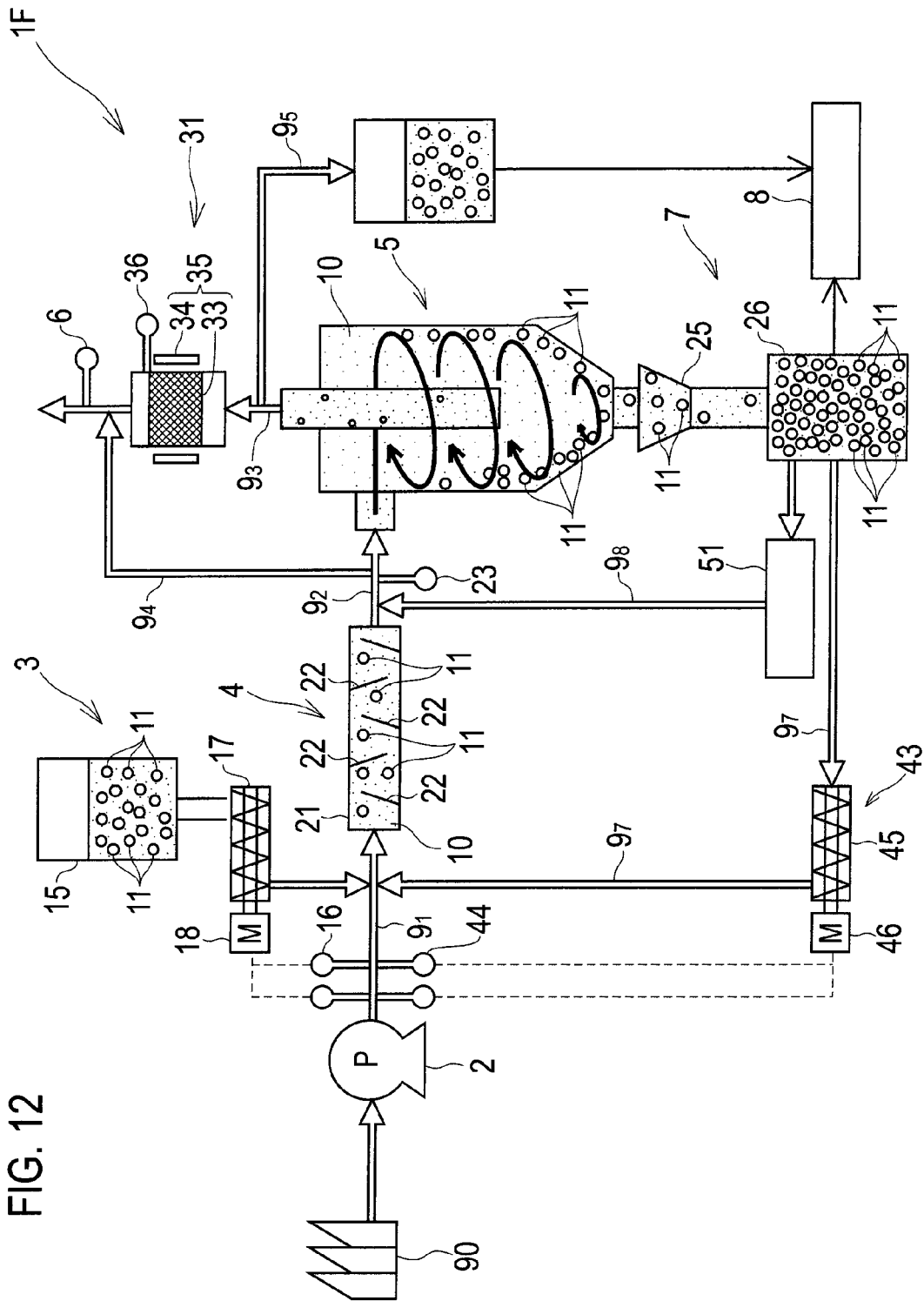
FIG. 12 is an overall configuration diagram showing a seventh embodiment of a valuable resource recovery system according to the present invention.

Next, explained is a seventh embodiment that is partly modified from the combination of the above described first and sixth embodiments. FIG. 12 shows an overall configuration diagram showing the seventh embodiment. Note that configurations identical-to or equivalent-to those in the above mentioned embodiments are provided with the same numerals to abbreviate their redundant explanations.

As shown in FIG. 12, a valuable resource recovery system 1F according to the seventh embodiment includes the configuration of the sixth embodiment, the engineered powder supply unit 3, a return pipe $9_8$, and an adjustment unit 51.

The return pipe $9_8$ connects the collection cartridge 26 of the engineered powder collection unit 7 with the pipe $9_2$. That is, the return pipe $9_B$ connects the engineered powder collection unit 7 with the upstream of the engineered powder separation unit 5. The adjustment unit 51 is provided in the middle of the return pipe $9_8$. The adjustment unit 51 regulates a flowing direction of the drainage water 10 through the return pipe $9_8$ in a one-way direction from the collection cartridge 26 to the pipe $9_2$. The adjustment unit 51 also adjusts a flow rate of the drainage water 10 through the return pipe $9_8$. The adjustment unit 51 controls the flow rate by adjusting a valve opening, controlling a pump or the like.

In the valuable resource recovery system 1F according to the seventh embodiment, a drawing flow through the pod 25 and the collection cartridge 26 can be created by the adjustment unit 51. Therefore, separation performance of the engineered powder 11 in the engineered powder separation unit 5 can be improved in the valuable resource recovery system 1F.

Note that it is preferable the drawing flow by the adjustment unit 51 is created so as not to pump the collected engineered powder 11 out of the collection cartridge 26. However, even if the engineered powder 11 is pumped out from the collection cartridge 26, it is again separated in the engineered powder separation unit 5 and no problem occurs in the drainage treatment process.

(Eighth Embodiment)

Figure 13:
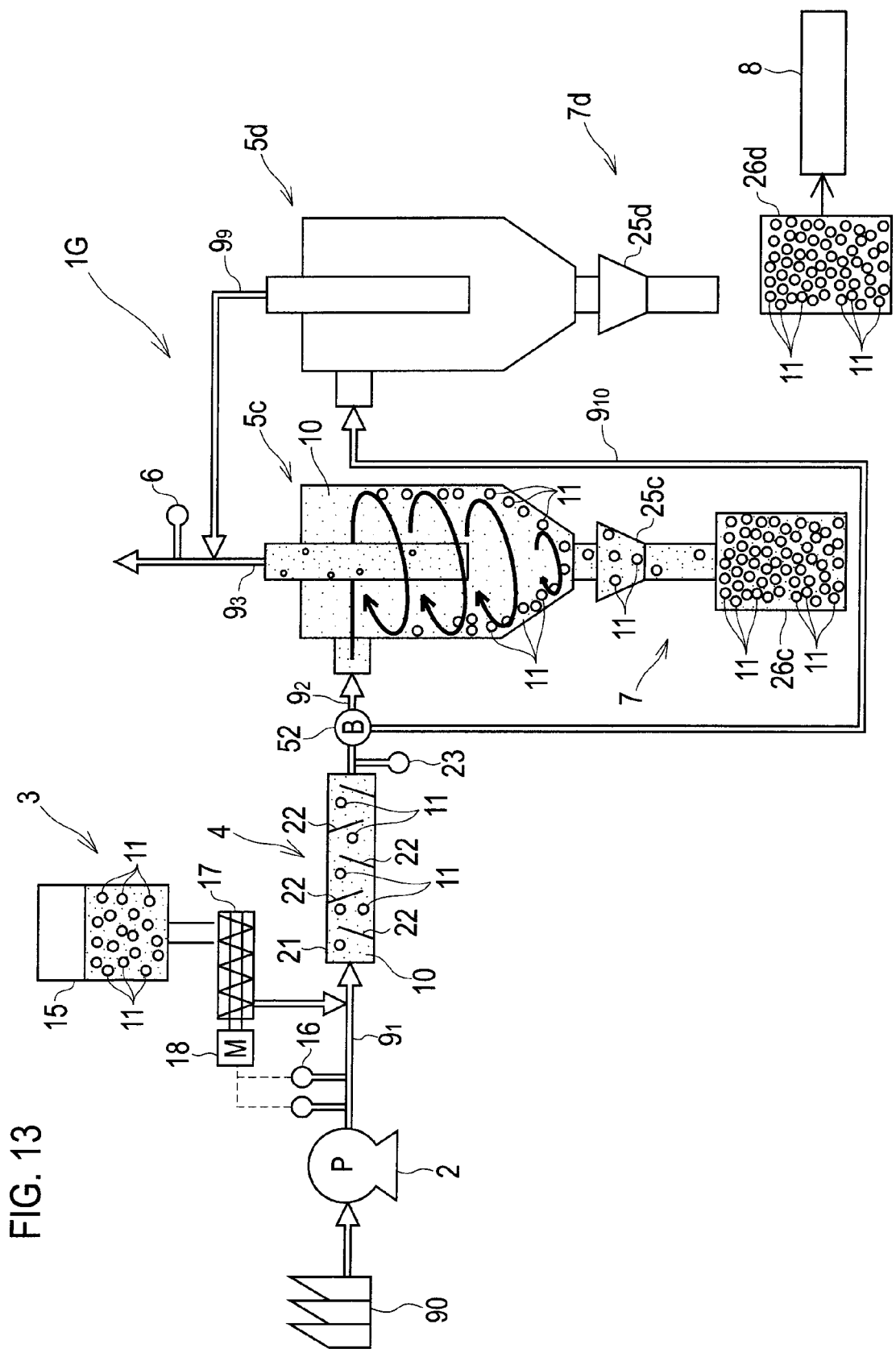
FIG. 13 is an overall configuration diagram showing an eighth embodiment of a valuable resource recovery system according to the present invention.
Figure 14:
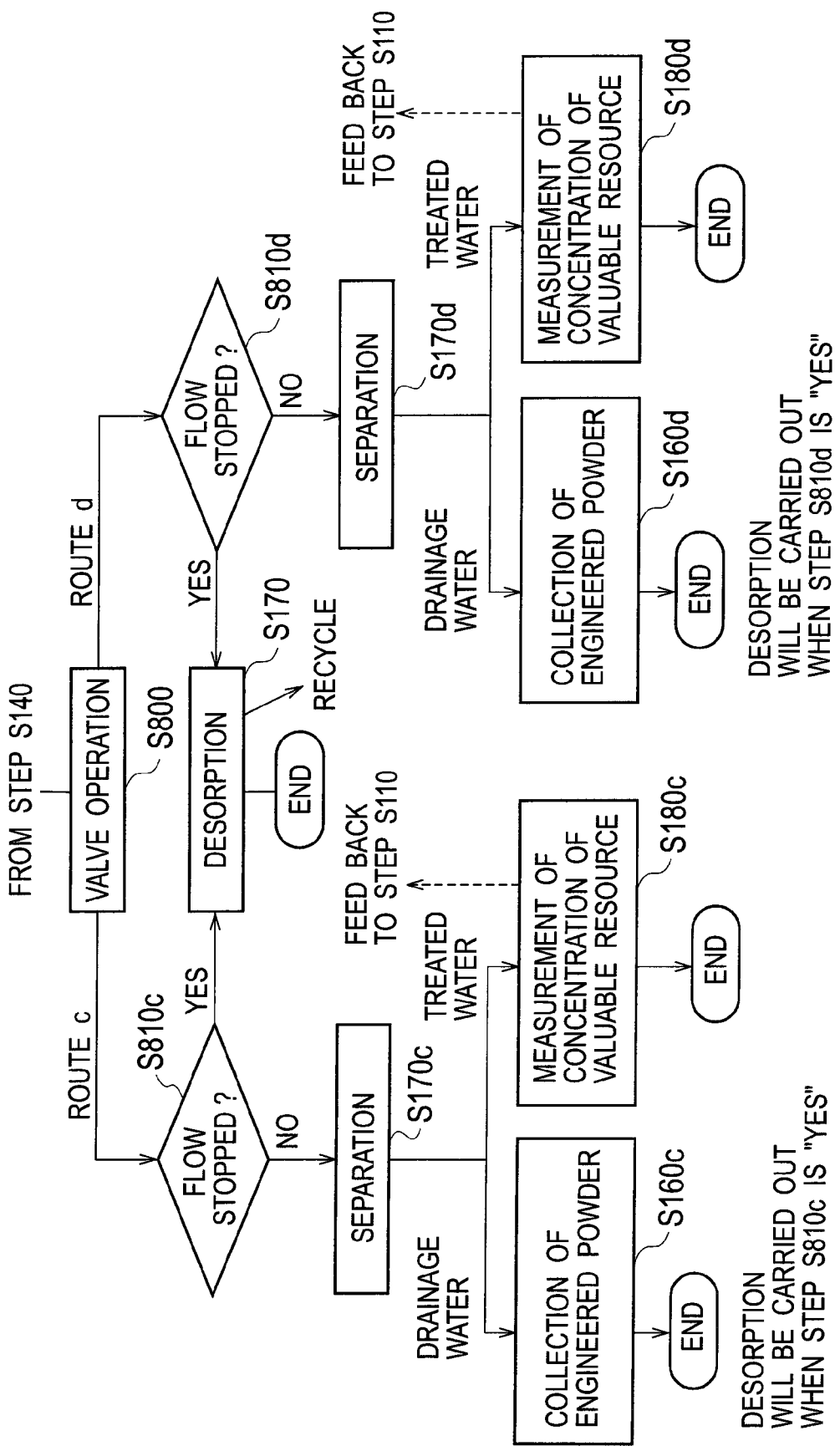
FIG. 14 shows a flow chart of operations in the eighth embodiment (showing only modified section from the flow chart shown of the first embodiment shown in FIG. 3)

Next, explained is an eighth embodiment that is partly modified from the above described first embodiment. FIG. 13 shows an overall configuration diagram showing the eighth embodiment. Note that configurations identical-to or equivalent-to those in the first embodiment are provided with the same numerals to abbreviate their redundant explanations. FIG. 14 shows a flow chart of operations of the present embodiment but it shows only a modified section from the flow chart shown in FIG. 3.

As shown in FIG. 13, a valuable resource recovery system 1G according to the eighth embodiment includes the drain pump 2, the engineered powder supply unit 3, two of the identical engineered powder separation units 5c and 5d. the measuring instrument 6, two of the identical engineered powder collection units 7c and 7d. the desorption-recycle unit 8, the pipes $9_n$ (n=1, 2, 3, 9, 10) that connect the above units, and a valve 52.

A set of the engineered powder separation unit 5c and the engineered powder collection unit 7c are arranged parallel to another set of the engineered powder separation unit 5d and the engineered powder collection unit 7d (cf. routes c and d in FIG. 14). Note that the engineered powder separation units 5c and 5d and the engineered powder collection units 7c and 7d are identical to the engineered powder separation unit 5 and the engineered powder collection unit 7 in the first embodiment, respectively.

The pipe $9_9$ connects the engineered powder separation unit 5d with the pipe $9_3$ for delivering the treated water separated in the engineered powder separation unit 5d. The pipe $9_{10}$ connects the pipe $9_2$ with the engineered powder separation unit 5d for delivering the draining water 10 agitated in the agitation unit 4. The valve 52 changes over the flow of the drainage water 10 to the engineered powder separation unit 5c or 5d. The valve 52 is disposed at a branch point of the pipes $9_2$ and $9_{10}$.

In the valuable resource recovery system 1G according to the eighth embodiment, the delivery of the drainage water 10 to the engineered powder separation unit 5c or 5d is stopped by changes over the flow of the drainage water 10 using the valve 52 (step S800). Then, the collection cartridge 26d (26c) of the stopped side is removed from the pod 25d (25c) (YES in step S810c or S810d) and moved to the desorption-recycle unit 8, and the engineered powder 11 is desorbed (step S170) and regenerated. In addition, the drainage water 10 is supplied to the engineered powder separation unit 5c (5d) of the other side (NO in step S810c or S810d) to continue the drainage treatment process (steps S150c. S160c and S180c. or steps S150d. S160d and S180d). As a result, the drainage treatment process can be continued without a break.

Although the present invention is explained with the above described embodiments, the present invention is not limited to the embodiments. The scope of the present invention is to be defined in accordance with the scope of the appended claims and the scope of their equivalents. Shapes, materials, arrangements, quantities of the elements in the above embodiments can be changed and modified arbitrarily within the scope of the present invention. In addition, one of the above embodiments can be combined with another of the above embodiments.

Hereinafter, modified examples of the above embodiments are explained.

(Modified Examples of Engineered Powder)

Modified examples of the engineered powder that can adsorb oil are explained.

<Carrier>

First, modified examples of the carrier composing the engineered powder are explained. The carrier is a core of the engineered powder for oil and selected from materials that are not chemically-altered notably when they are steeped in water for a short time. Therefore, the kinds of the carriers are not limited, even if they meet the above requirements. For example, the carrier may be an inorganic particle, a metal particle and so on.

As the inorganic particle or the metal particle, a ceramic particle of molten silica, crystalline silica, glass, talc, alumina, calcium silicate, calcium carbonate, barium sulfate, magnesia, silicon nitride, boron nitride, aluminum nitride, magnesia oxide, beryllium oxide, mica and so on; aluminum, iron, copper, alloy thereof and so on; and/or oxidation products thereof such as magnetite, ilmenite, pyrrhotite, magnesioferrite, cobalt ferrite, nickel ferrite, barium ferrite can be used.

Especially, as explained below, it is preferable that the inorganic particle or the metal particle contains magnetic material, because it is advantageous on collecting the engineered powder for oil mentioned above.

The magnetic material is not limited, but is preferably one that possesses ferromagnetic property in a room temperature range. However, it is not limited to the above for the embodiments, ferromagnetic material is generally used. For example, iron, alloy containing iron, magnetite, ilmenite, pyrrhotite, magnesioferrite, cobalt ferrite, nickel ferrite, or barium ferrite may be used.

The present invention can be achieved effectively with ferritic compounds that possess superior stability in water among the above. Note that magnetite ($Fe_3O_4$) used in the above embodiments is preferable, because it is not only low-cost but also easily used for a water treatment due to its stability in water as magnetic material and its safety as an element.

In addition, the inorganic particle or the metal particle itself maybe made of magnetic material in the above embodiments. In this case, the magnetic material is configured as a magnetic particle, and it may have various shapes such as a spherical shape, a polyhedral shape, an amorphous shape but its shape is not limited. Further, its preferable particle size and shape as the magnetic particle may be arbitrary selected according to its production cost and so on, but a spherical shape or a waney polyhedral shape is especially preferable. Here, a spherical shape does not need to have an accurate sphericity but presents a spherical appearance, and includes an oval spherical shape, a spherical shape with a partially undulated surface or discontinuous rounded surfaces.

If the particle has a sharp edge, a polymer layer to be coated thereon at a later spray process is damaged. In this case, it may be hard to maintain a shape of a resin composite body, i.e. the intended engineered powder for oil. These kinds of the magnetic particles may be treated with plating, if needed, such as Cu plating, Ni plating. In addition, its surface may be treated with surface finishing for corrosion prevention or the like.

In addition, the magnetic material may have a configuration in which magnetic powders are combined with binder such as resin, instead of being directly formed into the magnetic particle as described above. In addition, the magnetic powder may be treated with surface finishing for hydrophobization using alkoxysilane compounds such as methyltrimethoxysilane, methyltriethoxysilan, phenyltrimethoxysilane and phenyltriethoxysilan. That is, the magnetic material is not specifically limited, even if it possesses magnetic property enough to be affected by a magnetic force on collecting the magnetic material using the magnetic force.

In addition, fine silica with an average particle diameter not exceeding 40 nm can be used as the inorganic particle. Since this silica has high capability of oil adsorption, the engineered powder possesses the oil adsorption capability due to not only the above mentioned shellac resin but also the silica. Therefore, the oil adsorption capability of the engineered powder for oil can be enhanced.

As the above silica, Aerosil 130, Aerosil 200, Aerosil 200V, Aerosil 200CF, Aerosil 200FAD, Aerosil 300, Aerosil 300CF, Aerosil 380, Aerosil R972, Aerosil R972V, Aerosil R972CF, Aerosil R974, Aerosil R202, Aerosil R805, Aerosil R812, Aerosil R812S, Aerosil 0X50, Aerosil TT600, Aerosil MOX80, Aerosil MOX170, Aerosil COK84, Aerosil RX200, Aerosil RY200 (all are trade names by Nippon Aerosil Co., Ltd.) and so on are specifically exemplified, and, especially, oleophilic silica with superior oil adsorption capability is preferable.

The size of the carrier may be varied according to various conditions such as magnetic force, flow speed and adsorption method in a treatment equipment, and density of the carrier. However, the size of the carrier in the above embodiments is generally 0.05 to 100 µm. The size of the carrier can be measured by a laser diffractometry method, for example. Specifically, it can be measured by Analyzer SADL-DS21 (trade name by Shimadzu Corporation) or the like.

If the size of the carrier exceeds 100 µm, downward settling in water becomes noticeable to cause worse dispersion into water. In addition, available effective surface areas of the engineered powder for oil reduce to cause worse adsorption amount of oil. On the other hand, if the size of the carrier becomes less than 0.05 µm, initial particles densely flocculate and float at an upper layer of a treatment solution to cause worse dispersion. In a case where the size of the carrier is small, the engineered powder may not be collected completely depending on the flow speed of the drainage water.

Note that, by setting the size of the carrier within the above mentioned range, the engineered powder with the size 0.2 µm to 5 mm, preferably 10 µm to 2 mm, is obtained. Effects with this size of the engineered powder are similar to that with the case with the above described size of the carrier, so that the oil adsorption capability of the engineered powder for oil can be enhanced.

Here, the "size of the carrier" is determined depending on a configuration of the carrier, so that it means a size of a featured portion in the configuration of the carrier. For example, in a case where the carrier is a particle, the size of the carrier means an average diameter of the particle. In a case where the carrier has a polyhedral shape or an amorphous shape, the size of the carrier means its maximum length and its maximum width.

Further, the carrier may have a fibrous shape, a sheet shape, a string shape and a net shape, in addition to a spherical shape, a polyhedral shape and an amorphous shape.

As the fibrous-shaped carrier, specifically exemplified are inorganic fibers such as whiskers of titania, aluminum borate, silicon carbide, silicon nitride, potassium titanate, basic magnesium, zinc oxide, graphite, magnesia, calcium sulfate, magnesium borate, titanium diboride, α-alumina, chrysotile and wollastonite; amorphous fiber such as E-glass fiber, silica alumina fiber and silica glass fiber; and crystalline fiber such as Tyranno fiber (registered trade name by Ube Industries, Ltd.), silicon carbide fiber, zirconia fiber, γ-alumina fiber, α-alumina fiber, PAN (polyacrylonitrile) carbon fiber and PITCH carbon fiber: and organic fibers such as polyethylene fiber, polypropylene fiber, polyester fiber.

<Coated Resin>

Next, modified examples of the coated resin composing the engineered powder are explained. Various shellac resins can be adopted as the coated resin. The shellac resin (also called merely as shellac) is made from resin-like material secreted by a bug Laccifer Lacca. The Laccifer Lacca is parasitic in branches of a moraceous plant (*Ficus wightiana, Ficus religiosa,* and so on) or a leguminous plant (*Albizia lebbeck, Albizia saman,* oobamamenoki [JP name], katch [JP name], *Cajanus cajan, Acacia nilotica,* and so on). The resin-like material is collected as stich lac that is the secreted material solidified so as to cover the branches. The COO (country of origin) of the resin-like material is mainly India, Thailand, Myanmar, Indochinese Union and so on.

The resin-like material is separated by a specific gravity separation method. For example, when the resin-like material is immersed in water together with the cut-out branch, its resin component settles downward and the branch and impurities floats. Therefore, the resin component that settles downward is used as the shellac as it is. The shellac obtained in this manner is generally called as seed lac.

In addition, the shellac resin is made by defecating and bleaching the seed lac. In this case, the shellac resin contains resin acid ester as its main component and called white shellac. Further, the shellac resin is also made by dewaxing the white shellac and so on got in the above mentioned manner.

The shellac resin is pale-yellow to dark-brown colored and its putative structure includes alu-retinoic acid, shellolic acid, derivatives therefrom, and various organic acids. In the nature world, its cross-linking reaction progresses due to its reception of thermal history and then it becomes insoluble to complete its hardening. Therefore, in a case of using the shellac resin produced in the nature world, it is melted by the application of heat to have flowability.

Note that the shellac resin is also provided as marketed products in addition to one existing in the nature world. For example, it is sold by Japan Shellac Industries, Ltd. with trade names Lemmon No. 1. NSC (dewaxed product), NST-2 (containing-wax product), dried clear white lac (dewaxed and bleached product), dried lacteal white lac (dewaxed and bleached product) and so on. It is also sold by Gifu Shellac manufacturing Co., Ltd. with trade names GSA, GS, GSN, decolorizedsellac (PEAL-N811), lacteal white lac S-GB, lacteal white lac S-GBD, clear white lac GBND and so on.

The shellac resin can be used after a pulverization process from its production perspective of the intended engineered powder for oil. In addition, it is preferably dewaxed from a perspective of its hardening reaction property and its mechanical property, and one containing wax may reduce its mechanical property. In addition, bleached one from which pigments are completely removed is preferable from its colorization perspective.

Note that, although its reason is not made explicit, the above described shellac resin possesses a high oleophilic property and can adsorb oil contained in water at high rates in a water treatment.

In addition, the shellac resin preferably contains hydroxyfatty acid and sesquiterpene acid as explained in the above embodiments. Although its reason is not made explicit, by containing hydroxyfatty acid and sesquiterpene acid, the described shellac resin possesses a high oleophilic property and its oil adsorption capability can be improved.

(Other Engineered Powders)

In addition, the engineered powders for collecting oil and phosphorus are explained in the above embodiment. However, used can be the engineered powders that can collect other valuable resources such as fluorine, magnesium, boron, heavy metal ion, and noble metal ion.

(Modified Example of Precise Capture Device)

Figure 15:
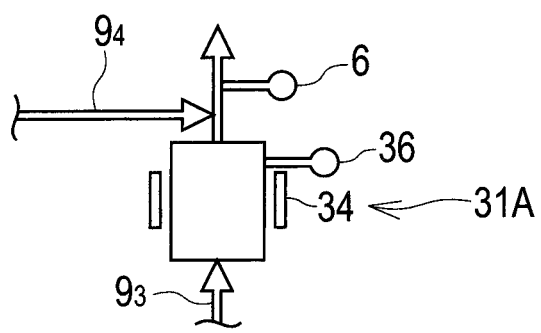
FIG. 15 is an explanatory diagram for a modified example of a precise capture device.

As shown in FIG. 15, the precise capture device 31A may be configured so as to capture the engineered powder 11 only by the electromagnet 34 without the metallic membrane 33. Alternatively, the precise capture device may be configured as a membrane separation device or a cyclone.

What is claimed is:

1. A valuable resource recovery system comprising:
   a first engineered powder supply unit that supplies a first engineered powder into drainage water, the first engineered powder being capable of adsorbing a first valuable resource and the first valuable resource being capable of being desorbed from the first engineered powder;
   an agitation unit that agitates the drainage water supplied with the first engineered powder;
   a first engineered powder separation unit that separates the first engineered powder from the drainage water agitated by the agitation unit;
   a first engineered powder collection unit that collects the first engineered powder separated by the first engineered powder separation unit;
   a desorption-recycle unit that desorbs the first valuable resource from the first engineered powder collected by the first engineered powder collection unit to recycle the first engineered powder and the first valuable resource;
   a precise capture device that is provided on a drainage side of treated water downstream of the first engineered powder separation unit and captures the first engineered powder that has not been separated from the drainage water and remains in the treated water, the drainage water having been separated into the first engineered powder and the treated water by the first engineered powder separation unit;
   a pipe for directing drainage water from an outlet of the agitation unit to an outlet of the precise capture device to backwash captured first engineering powder from the precise capture device; and
   a backwashing collection cartridge separate from the first engineering powder collection unit that collects the first engineered powder backwashed from the precise capture device.

2. The valuable resource recovery system according to claim 1, wherein the first engineered powder supply unit is provided as a quantitative supply unit, and the quantitative supply unit supplies the first engineered powder collected by the first engineered powder collection unit to an upstream of the agitation unit.

3. The valuable resource recovery system according to claim 1, wherein the first engineered powder comprises a carrier, and a coated resin that is coated around the carrier and capable of causing the first valuable resources desorbed from the carrier.

4. The valuable resource recovery system according to claim 1, further comprising
   a return pipe that connects the first engineered powder collection unit with an upstream of the first engineered powder separation unit, and
   an adjustment unit that is provided in a middle of the return pipe and adjusts a flow rate of the drainage water through the return pipe.

5. An operation method of a valuable resource recovery system, the system being configured according to claim 1 and further comprising
   a first measuring instrument that is disposed upstream from a supply point of the first engineered powder by the first engineered powder supply unit and measures concentration of the first valuable resource in the drainage water, the operation method comprising:
      controlling a supply amount of the first engineered powder to be supplied by the first engineered powder supply unit based on the concentration of the first valuable resource measured by the first measuring instrument and adsorption capability of the first engineered powder.

6. The operation method according to claim 5, wherein the system further comprises
   a second measuring instrument that is disposed downstream from an agitation point by the agitation unit and measures concentration of the first valuable resource in the drainage water, and the operation method further comprises:
controlling the supply amount of the first engineered powder to be supplied by the first engineered powder supply unit based on the concentration of the first valuable resource measured by the second measuring instrument.

7. The operation method according to claim 5, wherein the first engineered powder supply unit is provided as a quantitative supply unit, the quantitative supply unit supplies the first engineered powder collected by the first engineered powder collection unit to an upstream of the agitation unit, the system further comprises
a third measuring instrument that is disposed downstream from an agitation point by the agitation unit and measures concentration of the first valuable resource in the drainage water, and the operation method further comprises:
recirculating, by the quantitative supply unit, the first engineered powder repeatedly until the concentration of the first valuable source measured by the third measuring instrument exceeds a criterion value.

8. The operation method according to claim 7, wherein
the system further comprises a fourth measuring instrument that is disposed on a drainage side of treated water downstream from the first engineered powder separation unit and measures concentration of the first valuable resource in the treated water, the drainage water having been separated into the first engineered powder and the treated water by the first engineered powder separation unit, and
the operation method further comprises: replacing the first engineered powder when a measurement result of the fourth measuring instrument excesses over another criterion value.

9. The operation method according to claim 5, further comprising:
backwashing the precise capture device by directing drainage water from an outlet of the agitation unit to an outlet of the precise capture device with the pipe at intervals; and
collecting the first engineered powder backwashed from the precise capture device with the backwashing collection cartridge during the intervals.

10. The operation method according to claim 5, wherein the system further comprises:
a pressure measuring instrument that measures a pressure loss due to the precise capture device, and the operation method further comprises:
backwashing the precise capture device by directing drainage water from an outlet of the agitation unit to an outlet of the precise capture device with the pipe when the pressure loss measured by the pressure measuring instrument exceeds a criterion value; and
collecting the first engineering powder backwashed from he precise capture device with the backwashing collection cartridge.

11. The operation method according to claim 5, wherein the system further comprises:
a fifth measuring instrument that is disposed on the drainage side downstream from the precise capture device and measures concentration of the first engineered powder in the treated water, and the operation method further comprises:
backwashing the precise capture device by directing drainage water from an outlet of the agitation unit to an outlet of the precise capture device with the pipe when the concentration of the first engineered powder measured by the fifth measuring instrument exceeds a criterion value; and
collecting the first engineered powder backwashed from the precise capture device with the backwashing collection cartridge.

\* \* \* \* \*